(12) United States Patent
Ohno

(10) Patent No.: US 9,019,525 B2
(45) Date of Patent: Apr. 28, 2015

(54) PRINTING SYSTEM, CONTROL METHOD FOR PRINTING SYSTEM, AND STORAGE MEDIUM

(71) Applicant: Canon Kabushiki Kaisha, Tokyo (JP)

(72) Inventor: Hajime Ohno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/184,089

(22) Filed: Feb. 19, 2014

(65) Prior Publication Data

US 2014/0240748 A1    Aug. 28, 2014

(30) Foreign Application Priority Data

Feb. 26, 2013  (JP) ................................. 2013-035996

(51) Int. Cl.
  *G06K 15/00* (2006.01)
  *G06F 3/12* (2006.01)
  *G03G 21/02* (2006.01)

(52) U.S. Cl.
  CPC ............ *G06F 3/1273* (2013.01); *G06F 3/1239* (2013.01); *G03G 21/02* (2013.01); *G06F 3/1219* (2013.01); *G06F 3/1288* (2013.01)

(58) Field of Classification Search
  None
  See application file for complete search history.

(56) References Cited

U.S. PATENT DOCUMENTS

| | | | | |
|---|---|---|---|---|
| 6,618,566 B2* | 9/2003 | Kujirai et al. | .................... | 399/79 |
| 8,064,075 B2* | 11/2011 | Yoshikawa | .................... | 358/1.14 |
| 8,542,385 B2* | 9/2013 | Akutsu | .................... | 358/1.15 |
| 8,767,237 B2* | 7/2014 | Sasagawa | .................... | 358/1.15 |
| 2008/0186530 A1* | 8/2008 | Kurozasa | .................... | 358/1.15 |
| 2013/0070266 A1* | 3/2013 | Hagiwara et al. | .................... | 358/1.9 |
| 2013/0145221 A1* | 6/2013 | Kaneko | .................... | 714/48 |

FOREIGN PATENT DOCUMENTS

JP  2008-165725 A  7/2008

* cited by examiner

*Primary Examiner* — Satwant Singh
(74) *Attorney, Agent, or Firm* — Carter, DeLuca, Farrell & Schmidt, LLP

(57) ABSTRACT

A print service server of a printing system manages information included in the print job to be transmitted and that is specific information required for specifying a user ID, and a user ID that has been registered with the print service server, an image processing apparatus transmits, to a counting server, the number of printed sheets used upon printing based on the print job and the specific information included in the print job, and the counting server queries the managing unit based on the transmitted specific information of the user ID that has been registered with the print service server and saves a user corresponding to the user ID acquired as the result of the query by the query unit, and the number of printed sheets transmitted by the transmission unit by associating them with each other.

8 Claims, 18 Drawing Sheets

FIG. 4A

| Date and time | User ID | Job ID | Number of sheets | Transmission flag |
|---|---|---|---|---|
| 2012/04/18 08:45:12 | 023456 | 111111111 | 15 | Transmitted |
| 2012/04/18 09:11:40 | CloudPrint | ABC-00A8D034 | 3 | Not transmitted |
| ... | ... | ... | ... | ... |

FIG. 4B

| Printer ID | Date and time | User ID | Job ID | Number of sheets | ... |
|---|---|---|---|---|---|
| MFP-XX | 2012/04/18 05:00:00 | xxx | xxxxxx | x | ... |
| MFP-01 | 2012/04/18 08:45:12 | 023456 | 111111111 | 15 | ... |
| MFP-01 | 2012/04/18 09:11:40 | 023456 | ABC-00A8D034 | 3 | ... |
| MFP-YY | 2012/04/18 09:12:45 | yyy | yyyyyy | y | ... |

FIG. 4C

| Date and time | User ID | Job ID | Number of sheets | Transmission flag |
|---|---|---|---|---|
| 2012/04/18 08:45:12 | 023456 | 111111111 | 15 | Transmitted |
| 2012/04/18 09:11:40 | User-X | ABC-00A8D034 | 3 | Not transmitted |
| ... | ... | ... | ... | ... |

FIG. 4D

| Date and time | User ID | Job ID | Number of sheets | Transmission flag |
|---|---|---|---|---|
| 2012/04/18 08:45:12 | 023456 | 111111111 | 15 | Transmitted |
| 2012/04/18 09:11:40 | 023456 | ABC-00A8D034 | 3 | Not transmitted |
| ... | ... | ... | ... | ... |

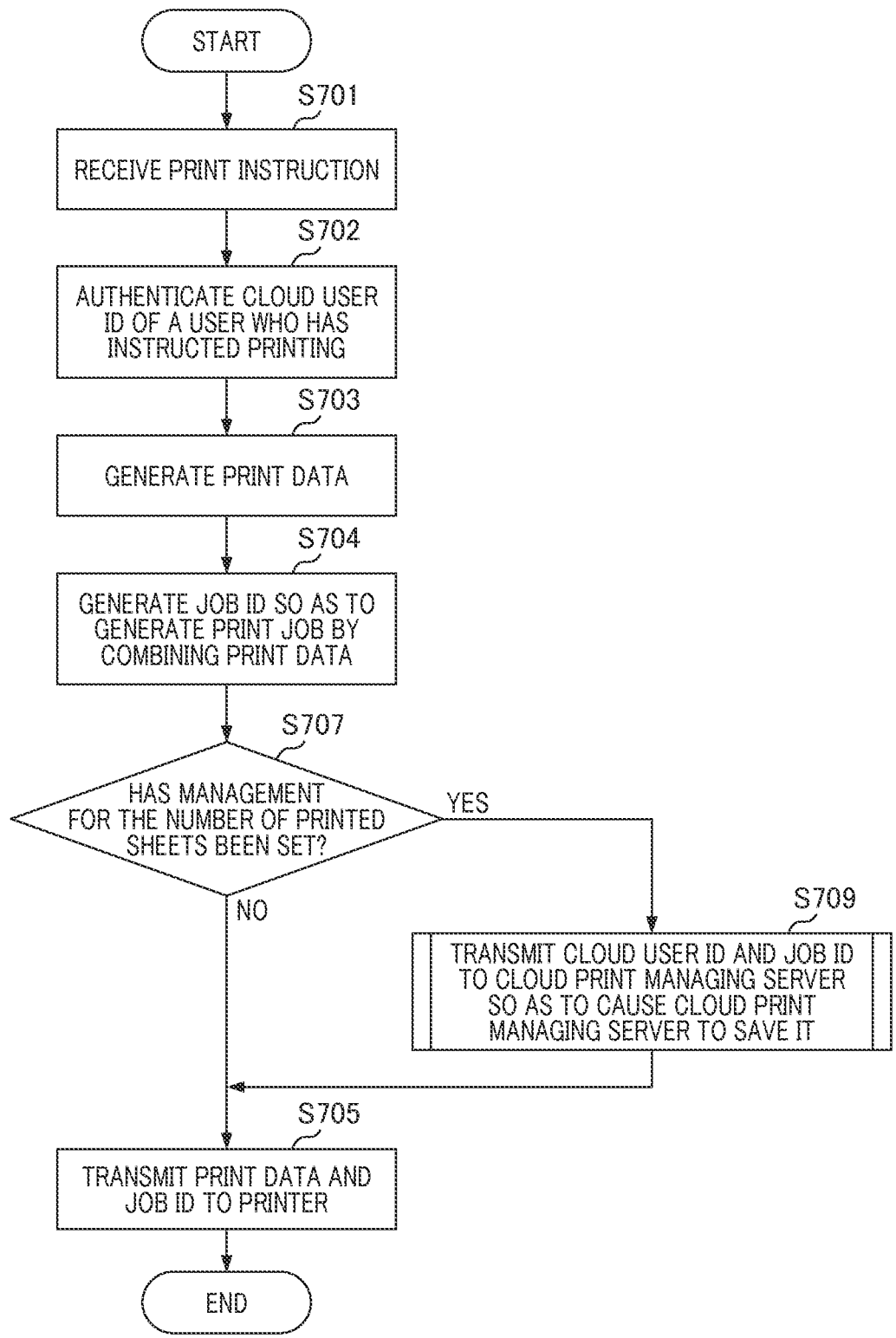

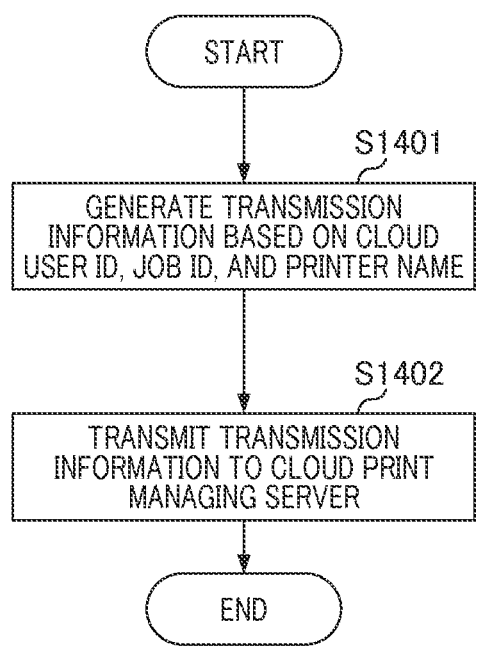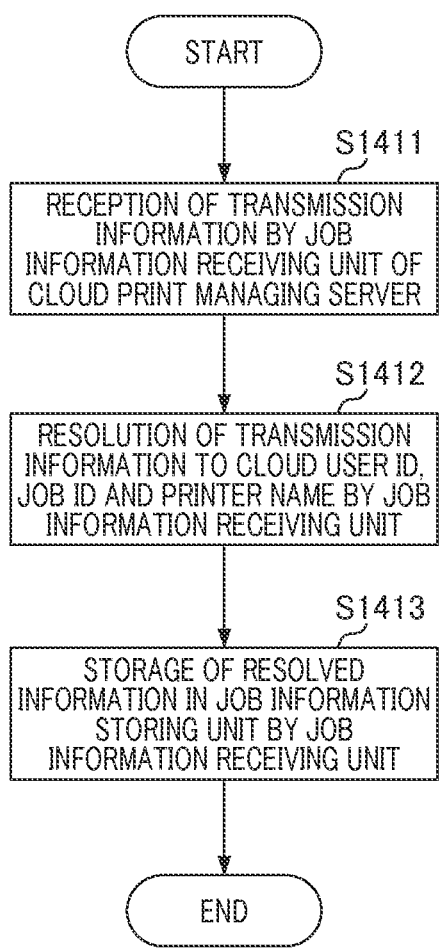
FIG. 11A
FIG. 11B

FIG. 12

| Printer name | Cloud user ID | Job ID |
|---|---|---|
| MFP-01 | User-X | 00A8D034AC |
| MFP-01 | User-Y | 00A8D034AF |
| MFP-02 | User-X | 00A8D0875D |
| SFP-01 | User-Z | ... |
| LBP5900-1 | ... | ... |
| ... | ... | ... |

| Cloud user ID | Target printer name | Excess flag |
|---|---|---|
| User-X | MFP-01/MFP-02/SFP-01/LBP5900-1 | Excess |
| User-Y | MFP-01/MFP-02/SFP-01/LBP5900-1 | Not yet excess |
| User-Z | MFP-01/MFP-02/SFP-01/LBP5900-1 | Not yet excess |
| ... | ... | ... |

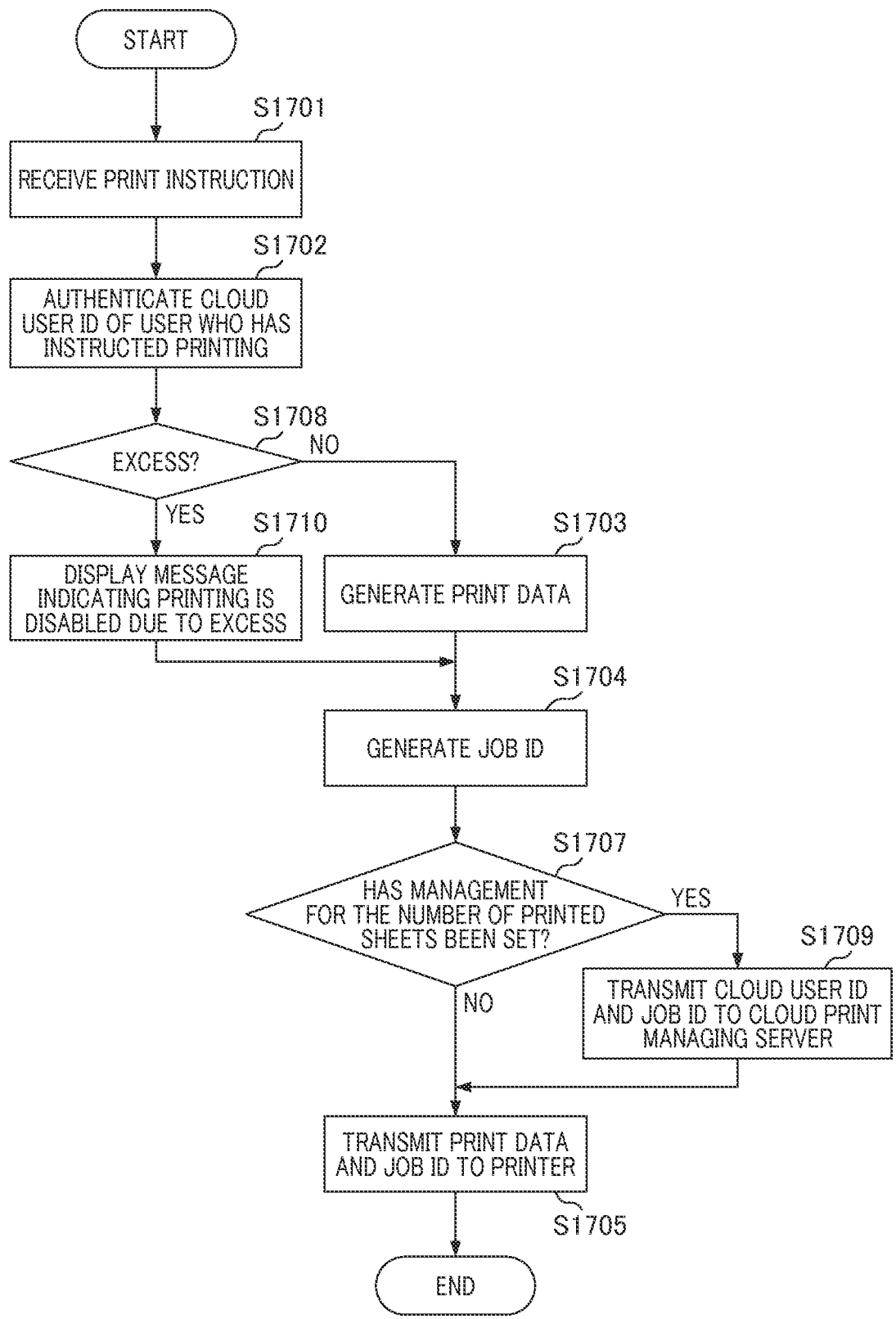

PRINTING SYSTEM, CONTROL METHOD FOR PRINTING SYSTEM, AND STORAGE MEDIUM

BACKGROUND OF THE INVENTION

1. Field of the Invention

The present invention relates to a printing system, a control method for the printing system, and a storage medium.

2. Description of the Related Art

When a plurality of printers is used in a company, a plurality of PCs and the plurality of printers are connected via a communication network. In this manner, users can share and use the printer. A conventional printer executes all printer jobs received regardless the type of print job. However, as a communication network is broadened and connected to other hubs or outside a company, an unknown user must be prevented from using the printer. Hence the printer came to be equipped with a user authentication function, and a user ID and a password came to be saved in the printer. However, this method leads to a cumbersome management in the case where there are a number of printers. Thus, a method is generally applied where a dedicated authentication server unifies management of user information, and the printer queries the dedicated server when the user authentication is required.

Also, for reducing print costs, a manager is required for comprehending management conditions. Thus, a technique is provided in which the number of printed sheets is counted for each user and managed. The printer authenticates a user ID when executing printing, counts the number of printed sheets after the printing, and combines the number of printed sheets and the user ID. Then, by transmitting the number of printed sheets and the user ID by the printer to the counting server, the counting server counts the number of printed sheets for each user ID. With this technique, a manager acquires the result of the counting of the number of printed sheets for each user and manages it.

Japanese Patent Laid-Open No. 2008-165725 discloses a method by which, when there are two different printing systems, a server superior to the systems is installed, collects count information, management information and the like from the respective systems to thereby integrally manage the systems. However, this method assumes that one user uses an identical user ID in the different systems. Thus, the method does not consider the case where one user has two different user IDs for the respective printing systems. Therefore, when one user has two different user IDs for the respective printing systems, an integral management for each user cannot be realized.

SUMMARY OF THE INVENTION

A printing system of the present invention manages print-related information for each user even if a user uses a printer with different user IDs.

A printing system of an embodiment according to the present invention includes an image processing apparatus, a counting server that manages the number of printed sheets printed by the image processing apparatus, and a print service server that transmits a print job to the image processing apparatus via a network. The print service server includes a management unit configured to manage information included in the print job to be transmitted and that is specific information required for specifying a user ID, and a user ID that has been registered with the print service server. The image processing apparatus includes a transmission unit configured to transmit, to the counting server, the number of printed sheets used upon printing based on the print job and the specific information included in the print job. The counting server includes a query unit configured to query the managing unit based on the transmitted specific information about the registered user ID that has been registered with the print service server; and a saving unit configured to save and manage a user corresponding to the user ID acquired as the result of the query by the query unit, and the number of printed sheets transmitted by the transmission unit by associating them with each other.

Further features of the present invention will become apparent from the following description of exemplary embodiments (with reference to the attached drawings).

BRIEF DESCRIPTION OF THE DRAWINGS

FIG. 4A to FIG. 4D illustrate storage information of a job log and a consolidated job log.

FIG. 10 illustrates a flowchart of the print job generation processing by the cloud print server.

FIG. 11A and FIG. 11B illustrate flowcharts of the processing for storing a job ID and a cloud user ID by associating them with each other.

FIG. 12 illustrates an example of job information stored in the cloud print managing server.

FIG. 13 illustrates an example of the excess number of printed sheets information stored in the cloud print managing server.

FIG. 17 illustrates a flowchart of the print job generation processing by the cloud print server.

DESCRIPTION OF THE EMBODIMENTS

Figure 1:
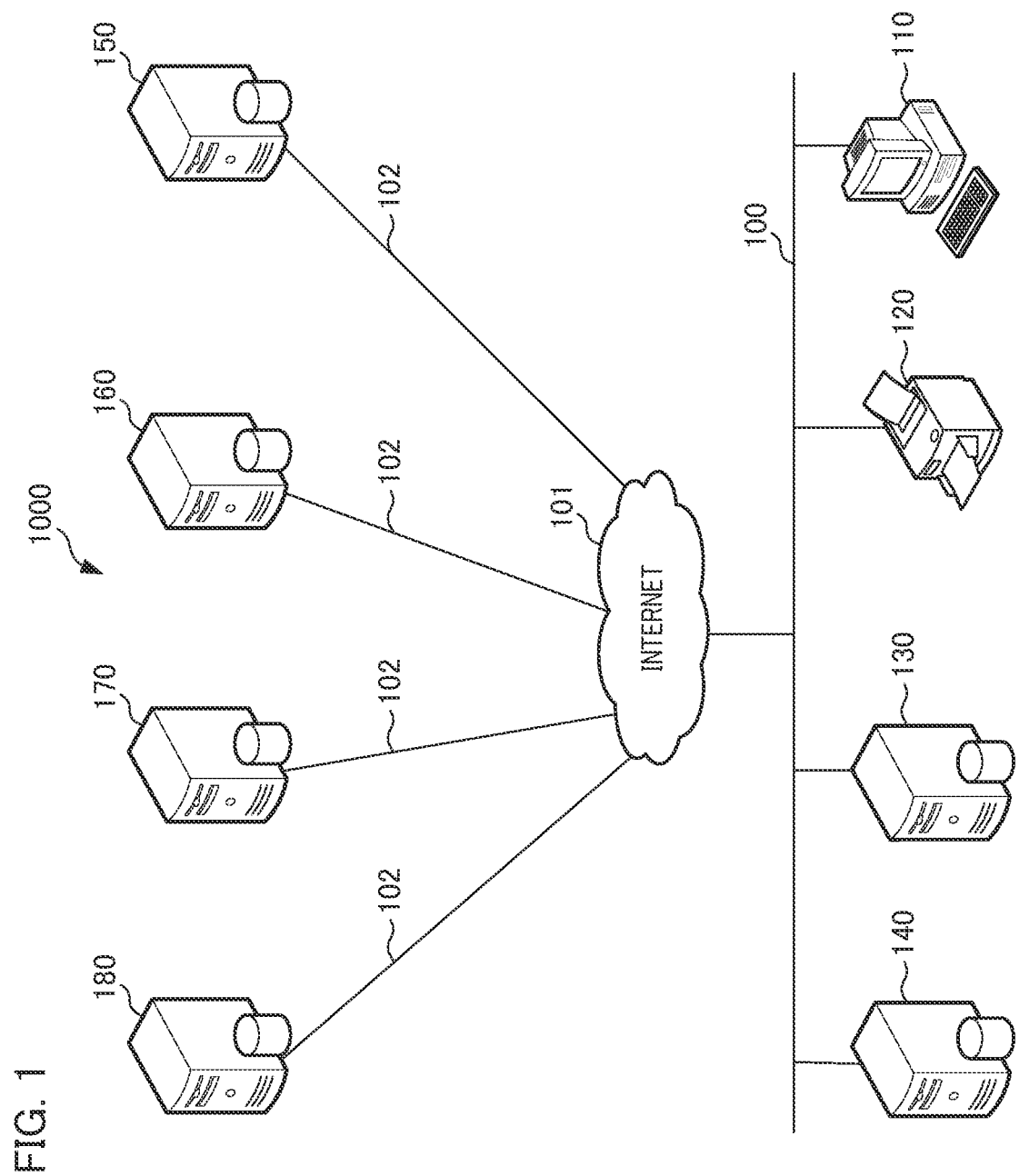
FIG. 1 illustrates a configuration example of a printing system in an embodiment.

A printing system is proposed in which a client transmits a print instruction to a Web server and the like, and the Web server that has received the print instruction converts a content to be printed to print data. The concept of a cloud computing has recently attracted attention, and cloud computing can also be considered as one of a configuration in which a server provides a client with services along with the printing system. A main feature of cloud computing is that data conversion and data processing are executed in a distributed manner using many computing resources so as to process requests from many clients in a simultaneous manner. At present, vendors provide various types of services in an unorganized manner by implementing web services in a cloud computing environment to realize cloud computing.

For example, Google (Registered Trademark) has developed a mechanism for data communication designed to provide services in conjunction with image forming apparatuses, and has publicly disclosed interfaces designed for image forming apparatuses to conduct data communication in a cloud computing environment prepared by Google (Registered Trademark). By installing this interface in image forming apparatuses, it is possible for a client to designate an image forming apparatus to conduct printing, even if the image forming apparatus and the server are connected via the Internet. This is called a cloud print system.

Generally, in the cloud system, a user ID that can be used in over all the cloud system is given from a provider of the cloud system to each user. Cloud printing system has the same configuration, and performs user identification/authentication by using a user ID given by the cloud printing system.

However, in light of security, the user ID is not generally included in a print job in the cloud printing system. The reason is as follows. The cloud printing system is a printing system that connects an indeterminate number of users and printers. Users share a printer by the following procedure:
(1) An owner of a printer registers the printer with the cloud printing system.
(2) The owner of the printer allows other users in the cloud printing system to use the printer.

The owner of the printer is merely a general user in the cloud printing system who has an ownership of the printer, and thus the procedure is communicated between general users. Thus, a manager of the cloud printing system cannot confirm/ensure whether the registered printer is a legitimate printer or not, or a network that connects thereto can be relied upon. Hence, if a person such as the owner of the printer or the like who can physically access the printer or the network that connects to the printer has malicious intent, that person can lead other user to a phony printer by deceiving the owner of the printer. Also, the person having such malicious intent can plant a bug between the legitimate printer and the network to thereby illegally acquire print job information. If a user name is included in the print job, a user ID in the cloud printing system is collected, resulting in a risk in which a print content associated with the user ID is collected.

Thus, in the cloud printing system, the user ID is not generally included in the print job. Since the user ID is not included in the print job in cloud printing, the printer has no chance to acquire the user ID. Specifically, in cloud printing, the printer cannot send, to the counting server, the user ID and print-related information by associating them with each other. In other words, in the cloud printing system, there is a problem that functions such as the count of a number of printed sheets, a use restriction of the printer, a management/track a print image log, or the like cannot be realized. Print-related information means information relating to the processing that is executed in response to a printing. For example, the print-related information is information indicating the number of printed sheets, and absence/presence of invalid words in a printed matter.

In recent years, the cloud services that are useful for generating a business document have increased. Thus, the needs for printing the generated content by using a printer in the intranet through the cloud printing system have been increased. Also, since the cloud printing system is generally available by a mobile terminal, the needs for printing, by a user who visits a plurality of relevant companies, and the generated content by using a printer in the intranet that is a destination through the cloud printing system have also increased.

For responding to the aforementioned needs, providers that provide the cloud print service offers a proxy server that intermediates communication between, for example, the cloud printing system and the printer to the intranet as an implementation directed to the companies. By means of this implementation, printing from the cloud printing system to a printer in the intranet can be realized while remaining a basic mechanism for the general consumer.

However, there are many cases where an intranet printing system coexists in which a printing is conducted from a PC inside the intranet to a printer inside the intranet. Thus, a current system provides an environment where one user can print with a printer in cloud printing or intranet printing system by using, for example, two user IDs that have been authenticated by different two user management/authentication system. As described above, since the user ID is not included in the print job in the cloud printing system, the manager of intranet printing cannot manage the aforementioned function relating to the printing for each user.

First Embodiment

A description will be given of a configuration of a printing system 1000 in the present embodiment. FIG. 1 illustrates a configuration example of a printing system 1000. The printing system 1000 includes a client 110, a printer 120, an intranet print managing server 130, an intranet user managing server 140, and a Web application server group 150. The printing system 1000 also includes a cloud print server group 160, a cloud print managing server group 170, and a cloud user managing server group 180. The intranet print managing server 130 and the intranet user managing server 140 function as a counting server in the present embodiment. The cloud print server group 160, the cloud print managing server group 170, and the cloud user managing server group 180 function as a print service server in the present embodiment.

The respective devices 110 and 120, and the respective server groups 130 and 140 configuring the printing system 1000 can connect to the server groups 150 to 180 via the Internet and perform data communication with each other. Four devices of the client 110, the printer 120, the intranet print managing server 130, and the intranet user managing server 140 are allocated in a company and connected with each other via a network 100 in the company. The network 100 in the company is connected to an Internet 101.

Four devices 110 to 140 may be connected via the Internet 101. Also, the Web application server group 150, the print service server 160, the cloud print managing server group 170, and the cloud user managing server group 180 are connected to the network 100 in the company via the internet. These four server groups may be provided by a same vender. In such the case, four server groups may be connected via the network 100. Note that one of each of the respective devices is shown, but plural devices may be provided. Also, the server groups are configured by plural servers but may be provided by one server. A control method in the present embodiment is the control method of the printing system shown in FIG. 1. The computer program in the present embodiment causes a computer to execute the control method.

Figure 2:
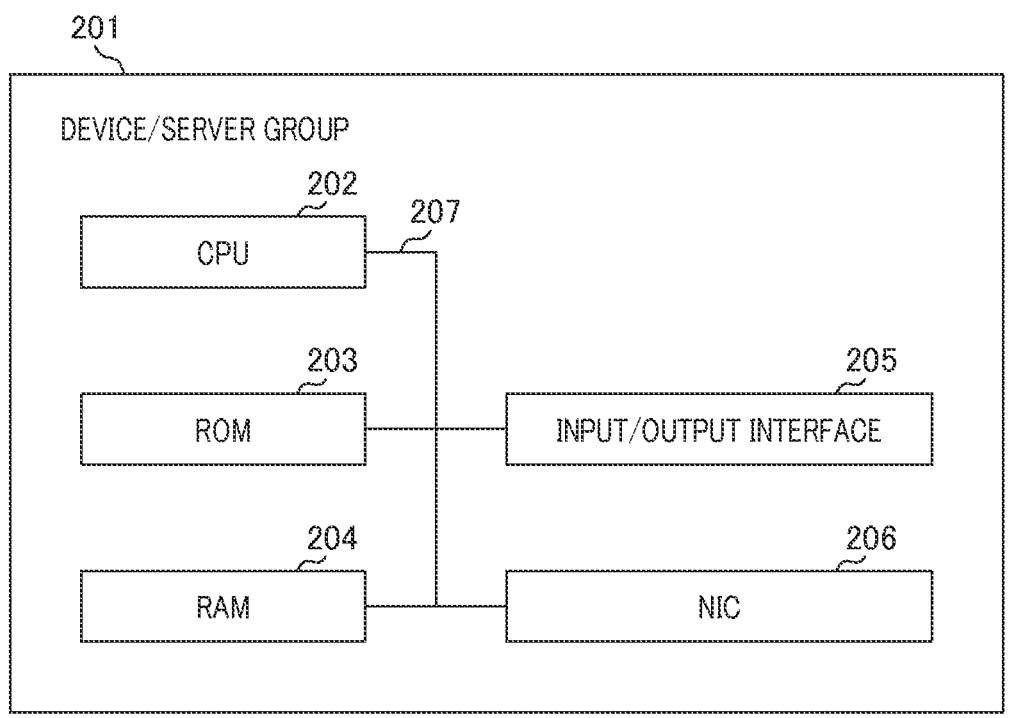
FIG. 2 illustrates hardware configuration examples of respective devices and server groups.

Next, a description will be given of a hardware configuration of the respective devices and server groups configuring the printing system 1000. FIG. 2 is a diagram illustrating the respective devices and server groups configuring the printing system 1000. Reference numeral 201 refers to the respective devices and server groups configuring the printing system 1000.

A CPU (Central Processing Unit) 202 is a unit that executes various programs to thereby realize different functions. A ROM (Read Only Memory) 203 is a unit that stores various programs. The CPU 202 loads the programs stored in the ROM 203 into a PAM (Random Access Memory) 204 so as to execute them. Also, the RAM 204 is used as a temporary working memory area for the CPU 202.

A Input/Output interface 205 is a unit that receives data from a pointing device (not shown) in addition to transmission of data to a display (not shown) connected to the respective devices and server groups. An NIC (Network Interface Card) 206 is a unit for connecting the respective devices and server groups configuring the printing system 1000 to the network 100. The units as described above can transmit/receive data via a bus 207. Also, the printer 120 is equipped with a printing unit (not shown) and the printing unit can transmit and receive data via a bus 207. The printing unit is a unit that can print image data such as a raster image on a recording medium such as a printing paper.

Figure 3:
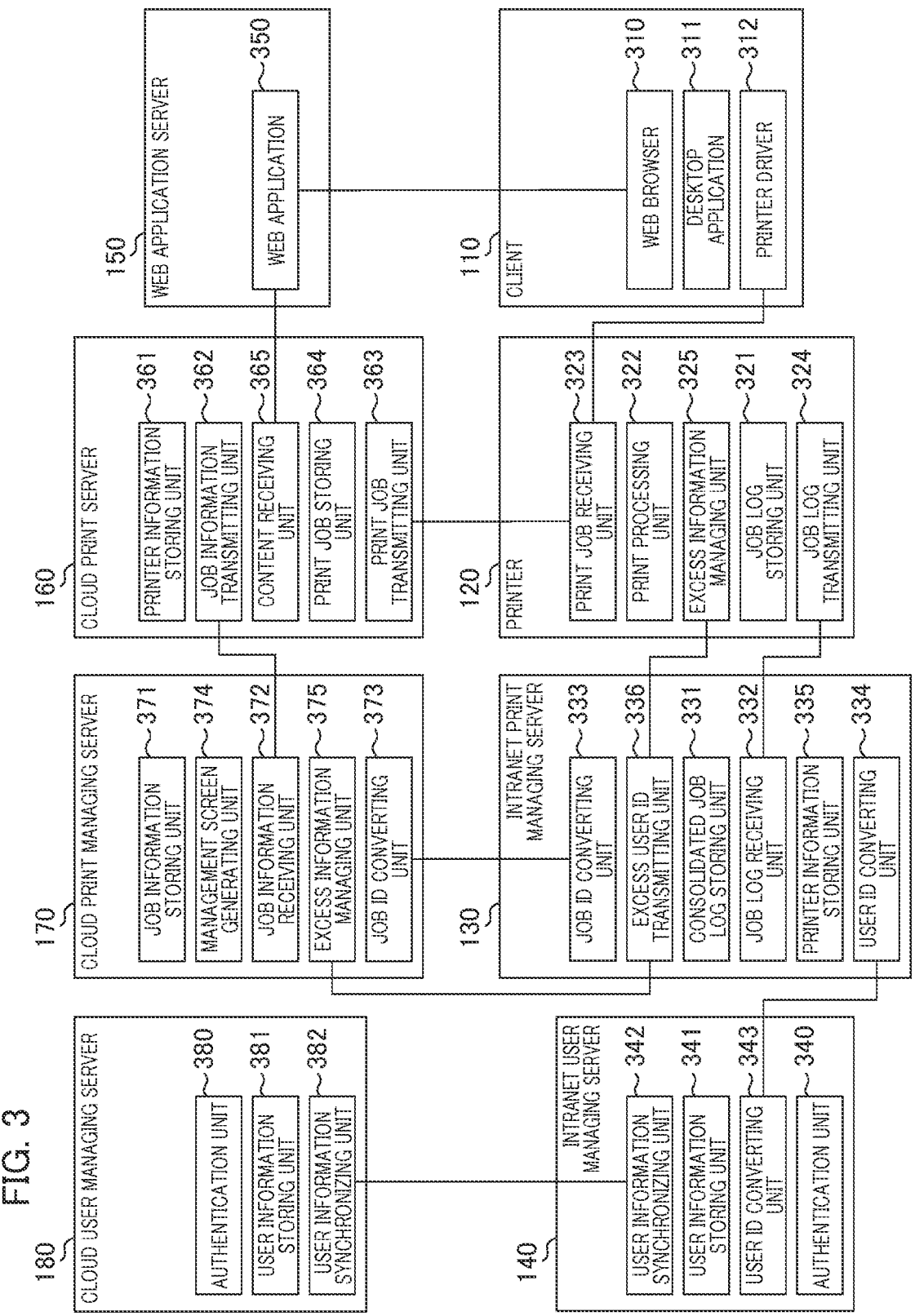
FIG. 3 illustrates software configuration examples of the respective devices and server groups.

Next, a description will be given of a software configuration of the respective devices and server groups configuring the printing system 1000. FIG. 3 illustrates a software configuration of the respective devices and server groups configuring the printing system 1000. Programs for realizing functions of the respective software configurations shown in FIG. 3 are stored in the ROM 203 of each device or server group. These functions are realized by loading the programs into the RAM 204 and executing them by the CPU 202.

In the following, a description will be given of configurations of the respective devices and server groups and functions realized by the respective devices and server groups. Firstly, a description will be given of software configuration examples of the respective devices and server groups with reference to FIG. 3. The client 110 includes a Web browser 310, a desktop application 311, and a printer driver 312. The Web browser 310 communicates with a Web application 350 of the Web application server 150 according to a user operation, and displays, generates and edits a content desired to be printed. The Web browser 310 submits the content to a content receiving unit 365 of the cloud print server 160 in a direct way or through the Web application 350 in an indirect way. At this time, the Web browser 310 prompts a user to input a cloud user ID and authentication information.

The desktop application 311 displays, generates, and edits the content to be printed according to a user operation. When a printing is performed using the printer 120, the desktop application 311 displays a printer selection screen, prompts a user to select a printer, and then transmits information about the content to the printer driver 312.

The printer driver 312 converts the content received from the desktop application 311 to a data format that the printer 120 can interpret, generates a print job by adding print control information, and then transmits the print job to a print job receiving unit 323. On this occasion, the printer driver 312 acquires an intranet user ID of a user who instructed printing from login information of the client 110, and adds the intranet user ID to the print job so as to transmit the print job.

The printer 120 includes a job log storing unit 321, a print processing unit 322, the print job receiving unit 323, the job log transmitting unit 324, and an excess information managing unit 325. The job log storing unit 321 stores a job log that is generated when the print processing unit 322 processes the print job. The job log is a log in which information about the print job printed by the printer is recorded. Note that a consolidated job log is a job log in which the job log transmitted by each printer is collected and combined, and may be compiled. For example, orders are replaced when combining, information is added, or the like, for simplifying a later usage. The print processing unit 322 executes the print processing and the print-related processing of the print job transmitted by the print job receiving unit 323. The print job receiving unit 323 receives the print job transmitted by the printer driver 312 or a print job transmitting unit 363 of the cloud print server 160. The print job receiving unit 323 transmits the print job to the print processing unit 322 after the processing such as a user authentication and the like.

The job log transmitting unit 324 extracts, at regular time intervals, job logs that are added after the previous transmission of job logs from among the job logs stored in the job log storing unit 321, and transmits the extracted job logs to a job log receiving unit 332 of the intranet print managing server 130. The excess information managing unit 325 receives, from the excess user ID transmitting unit 336, a user ID (group) of a user who uses the printer 120 regardless whether a limit of the number of printable sheets is exceeded, and saves it. Then, upon receipt of an inquiry about a specific intranet user ID from the print job receiving unit 323, the excess information managing unit 325 responds to the print job receiving unit 323 with excess information of the intranet user ID.

Next, a description will be given of functions provided with the intranet print managing server 130 and the intranet user managing server 140 that function as the counting server in the present embodiment. The intranet print managing server 130 includes a consolidated job log storing unit 331, the job log receiving unit 332, a job ID converting unit 333, a user ID converting unit 334, a printer information storing unit 335, and an excess user ID transmitting unit 336. The consolidated job log storing unit 331 stores job logs of which the job log receiving unit 332 receives, edits, and consolidates. Upon receipt of an inquiry from a display unit (not shown) of the intranet print managing server 130, the consolidated job log storing unit 331 extracts necessary logs from the consolidated job logs to thereby pass the extracted job logs to the display unit as a response. The job log receiving unit 332 receives, edits and consolidates the job logs transmitted by the job log transmitting unit 324 of the printer 120, and stores the job logs in the consolidated job log storing unit 331.

The job ID converting unit 333 transmits a job ID for cloud printing included in the job log as specific information to a job ID converting unit 373 of the cloud print managing server 170. The job ID converting unit 333 receives a cloud user ID corresponding to the transmitted job ID from the job ID converting unit 373. The user ID converting unit 334 transmits the cloud user ID received from the job ID converting unit 373 to a user ID converting unit 343 of the intranet user managing server 140, and receives an intranet user ID from the user ID converting unit 343. The printer information storing unit 335 manages connection information and print setting information of all printers (including the printer 120) managed by the intranet print managing server 130. The excess user ID transmitting unit 336 transmits, to the excess information managing unit 375 of the cloud print managing server 170, a cloud user ID of a user of which exceeds a limit of the number of printed sheets has been detected. Also, the excess user ID transmitting unit 336 transmits an intranet user ID of the relevant user to the excess information managing unit 325 of the printer 120.

The intranet user managing server 140 includes an authentication unit 340, a user information storing unit 341, a user information synchronizing unit 342, and the user ID converting unit 343. The authentication unit 340 performs user authentication with an intranet user ID and authentication information transmitted from a resource (such as the client 110 or the printer 120) inside the intranet, and responds to the resource that has queried an authentication result. The user information storing unit 341 manages information in a company. When a user is added or deleted, the user information synchronizing unit 342 transmits a cloud user ID of the user and information indicating the addition or deletion to a user information synchronizing unit 382 of the cloud user managing server 180. The user ID converting unit 343 receives the cloud user ID from the user ID converting unit 334 of the intranet print managing server 130, converts it to an intranet user ID by querying the user information storing unit 341, and transmits the intranet ID to the user ID converting unit 334 of the intranet print managing server 130.

The Web application server 150 includes the Web application 350. The Web application 350 edits electronic data representing content according to an instruction transmitted from the Web browser 310, converts the electronic data to a format that the Web browser can display, and transmits the conversion result to the Web browser 310. Also, upon receipt of a print instruction from the Web browser 310, the Web application 350 converts the content to a format that the cloud print server 160 can interpret and the converted content to the content receiving unit 365. The Web application 350 may have a function that intermediates an input for the cloud user ID and authentication information, and communication between the content receiving unit 365 and the Web browser 310 for selection of a printer.

The cloud print server 160 includes a printer information storing unit 361, a job information transmitting unit 362, the print job transmitting unit 363, a print job storing unit 364, the content receiving unit 365. The printer information storing unit 361 stores information required for the cloud print server 160 to connect to the printer 120 and a setting for managing the number of printed sheets for each printer. Upon transmission of the print job to the printer 120, the job information transmitting unit 362 transmits a set of an identifier of the printer, a job ID, and a cloud user ID to the job information receiving unit 372. When the print job transmitting unit 363 detects that the print job has been stored in an area of for the printer 120 in the print job storing unit 364, the print job transmitting unit 363 transmits the print job to the print job receiving unit 323 of the printer. When the printer 120 is registered with the cloud print server 160, the print job storing unit 364 ensures a print job storing area for the printer 120.

The content receiving unit 365 receives content from the Web application 350. The content receiving unit 365 requests the Web application 350 or the Web browser 310 for information required for authentication of a cloud user ID, and communicates with the authentication unit 380 of the cloud user managing server 180 after receiving the information to thereby perform authentication processing upon receipt of the information. The content receiving unit 365 requests the Web application 350 or the Web browser 310 for a selection of a printer, and stores the content in the print job storing area on the print job storing unit 364 in correspondence with the selected printer after receiving a selection result. Also, the content receiving unit 365 queries, before printing, the excess information managing unit 375 about whether or not an excess flag is set in the cloud ID of the user who requested printing.

The cloud print managing server 170 includes a job information storing unit 371, the job information receiving unit 372, the job ID converting unit 373, a management screen generating unit 374, and the excess information managing unit 375. The job information storing unit 371 receives a set of a cloud user ID, a job ID and an identifier of a printer from the job information transmitting unit 362 through the job information receiving unit 372, and stores the set. The job information receiving unit 372 receives a set of a cloud user ID, a job ID and an identifier of a printer from the job information transmitting unit 362 of the cloud print server 160 and stores the set in the job information storing unit 371. Upon receipt of the job ID from the job ID converting unit 333 of the intranet print managing server 130, the job ID converting unit 373 queries the job information storing unit 371 for a cloud ID corresponding to the job ID. The job ID converting unit 373 passes the cloud user ID in the reply by the job information storing unit 371 to the job ID converting unit 333.

The management screen generating unit 374 displays, for a system manager, a printer group that the system manager registered, prompts the system manager to select one or more printers desired to manage the number of printed sheets from among the printer group, and stores information relating to the selection in the printer information storing unit 361. The excess information managing unit 375 receives excess information for each cloud user ID from the intranet print managing server 130, and stores the excess information. Also, the excess information managing unit 375 replies to the content receiving unit 365 as to whether the excess flag is set to the designated cloud user ID when accepting a query about the excess flag setting.

The cloud user managing server 180 includes the authentication unit 380, a user information storing unit 381, and the user information synchronizing unit 382. The authentication unit 380 acquires necessary information for user authentication from the content receiving unit 365 when the user authentication of a cloud user ID is requested, performs the authentication processing, and passes the authentication result to the content receiving unit 365. The user information storing unit 381 stores the cloud user ID and its authentication information. Also, the user information storing unit 381 performs corresponding processing with respect to a reference from the authentication unit 380, or an addition/deletion request for a cloud user ID from the user information synchronizing unit 382. The user information synchronizing unit 382 receives an addition request for the cloud user ID or a deletion request for the cloud user ID from the user information synchronizing unit 342 of the intranet user managing server 140, and performs the addition/deletion processing stored in the user information storing unit 381.

Next, a description will be given of each user ID. The intranet user ID is an ID that a system manager in a company (a manager of the intranet) issues to users who use the intranet (generally, employees, temporary employees belonging the company, or the like). The intranet user ID is unique within the intranet. A user is required for the input of the intranet user ID before using the client 110 or the printer 120 that is a resource on the intranet as shown in FIG. 1. That is, the intranet user ID is used for confirming that the user is an allowable user and permitting the use of such devices.

On the other hand, the cloud user ID is an ID that a system manager in a business company providing the cloud service issues. The cloud user ID is globally unique since the cloud service generally can be accessed throughout the world. An input of the cloud user ID is required before using the cloud service, for example, the cloud print server 160 shown in FIG. 1, which is provided by the business company (the Web application server group 150 may not be provided depending on the business company). The cloud user ID is used for confirming that the allowable user uses the cloud service and permitting the uses of the cloud service. Also, when the printer is registered with the cloud print server 160, the cloud user ID of a printer manager is used. A communication between the cloud print server 160 and the printer 120 is performed based on the cloud user ID of the printer manager.

Conventionally, the aforementioned two IDs have been distinguished by considering the intranet user ID as an ID for a use in the company, and the cloud user ID as an ID for a personal use. However, in recent years, since the cloud system includes sufficient functions for a business use, usage of the cloud service in companies has been increased. When printing is performed by using the cloud print service, a server that provides the print service does not send a cloud user ID of a user to the printer because of the aforementioned security. Thus, since the cloud user ID is not converted to the intranet user ID before printing, a manager cannot comprehend a usage situation for each user which can be grasped in the intranet.

Next, a description will be given of pre-settings by a system manager and the like with reference to the software configuration diagram in FIG. 3. A system manager in the company or the like registers information of a general user (employee) with the user information storing unit 341 of the intranet user managing server 140. The information of a general user includes at least a user ID in the company (hereinafter called "intranet user ID"), authentication information such as a password in the company, and a user ID in the cloud system (hereinafter called "cloud user ID"). For example, a user ID (023456) shown in FIG. 4A is registered with the user information storing unit 341 as the intranet ID. Also, a user ID (User-X) shown in FIG. 4C is registered with the user information storing unit 341 as the cloud user ID. The intranet user ID and the cloud user ID are capable of being converted to each other by the user ID converting unit 343.

Also, the user ID information synchronizing unit 342 periodically transmits an added or deleted cloud user ID of a user to the user information synchronizing unit 382 of the cloud user managing server 180. The cloud user managing server is set to rely on the intranet user managing server 140, and the user information synchronizing unit 382 updates information of the user information storing unit 381 based on the received cloud user ID. Naturally, this synchronization processing may be manually performed.

A system manager in the company or the like registers the printer 120 with the cloud print server 160. In this manner, information for connecting to the printer 120 is stored in the printer information storing unit 361 of the cloud print server 160, which enables transmission of the print job from the print job transmitting unit 363 to the print job receiving unit 323 of the printer 120. The printer information storing unit 361 may be on the cloud print managing server 170 side. Also, an area for the printer 120 (hereinafter called "cloud spooler") is set up in the print job storing unit 364 at the same time as the registration. The print job stored in the cloud spooler is transmitted to the printer 120 by the print job transmitting unit 363, and deleted from the cloud spooler after the printing is completed.

Figure 5:
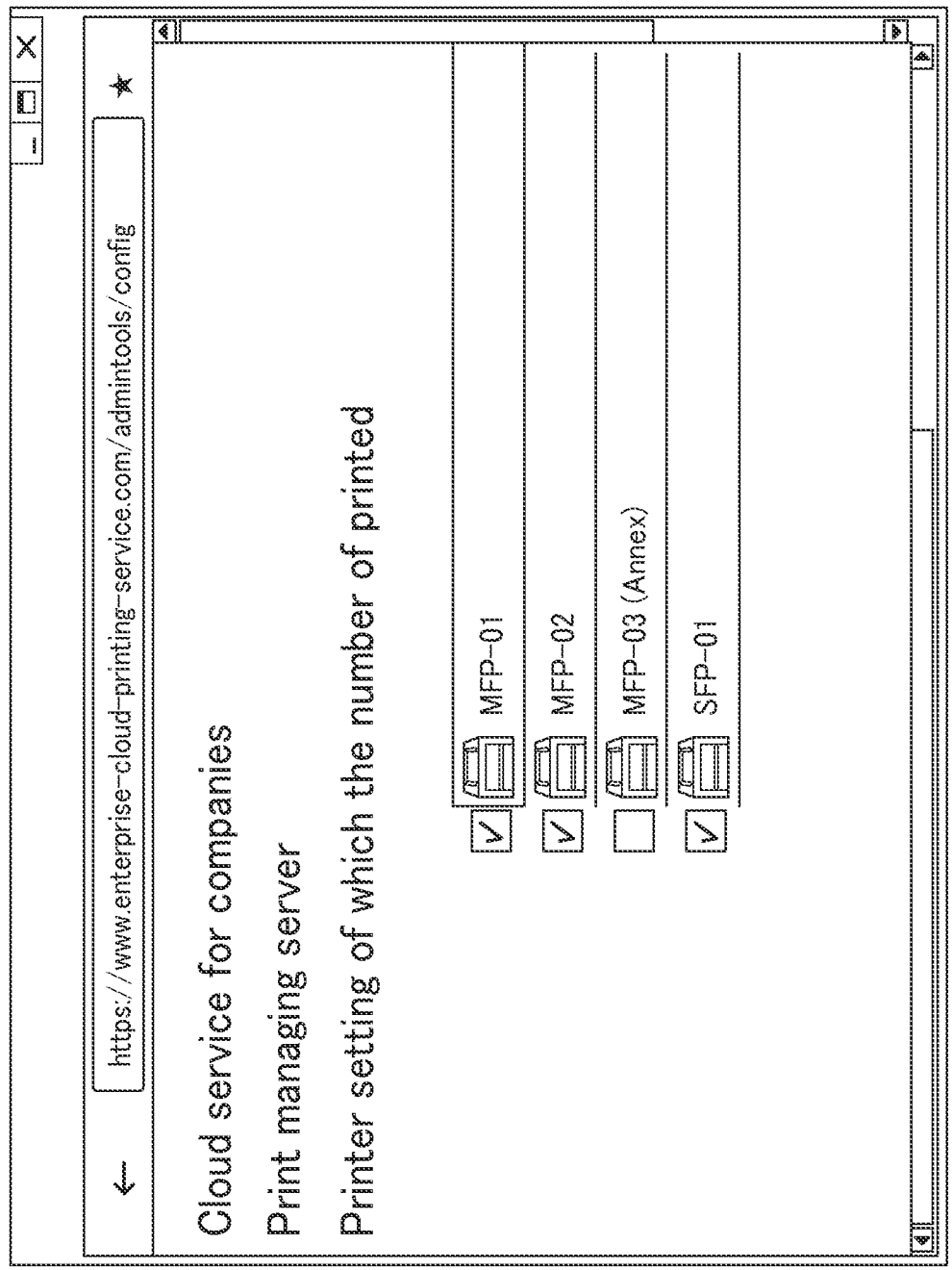
FIG. 5 illustrates a setting UI by a cloud print managing server.

Also, a system manager in the company or the like performs a setting for managing print-related information for the registered printer. More specifically, a system manager in the company or the like accesses the cloud print server 160 or the cloud print managing server 170 by using the Web browser. The management screen generating unit 374 of the cloud print managing server 170 extracts the printer (group) registered by the manager from the printer information storing unit 361, generates a screen shown in FIG. 5 so as to display it on the Web browser. The manager inputs a check to a printer desired for managing the number of printed sheets. The management screen generating unit 374 stores a setting flag for managing the checked printer in the printer information storing unit 361. In this manner, an operation in the cloud print server 160 is changed. The details thereof will be described below. Although print-related information will be described below, the number of printed sheets is assumed to be the print-related information in this example. A system manager in the company or the like registers a cloud user ID of a general user with the cloud spooler of the cloud print server 160. In this manner, the general user can log into the print service server 160 with his cloud user ID, and populate the print job to the cloud spooler.

Also, a system manager in the company or the like registers the intranet print managing server 130 with the printer 120. In this manner, the printer 120 transmits print-related information from the job log transmitting unit 324 to the intranet print managing server 130. A system manager in the company or the like registers the printer 120 with the intranet print managing server 130. In this manner, information required for connecting to the printer 120 is stored in the printer information storing unit 335 of the intranet print managing server 130, and print-related information transmitted from the printer 120 is stored in the consolidated job log storing unit 331.

Figure 6:
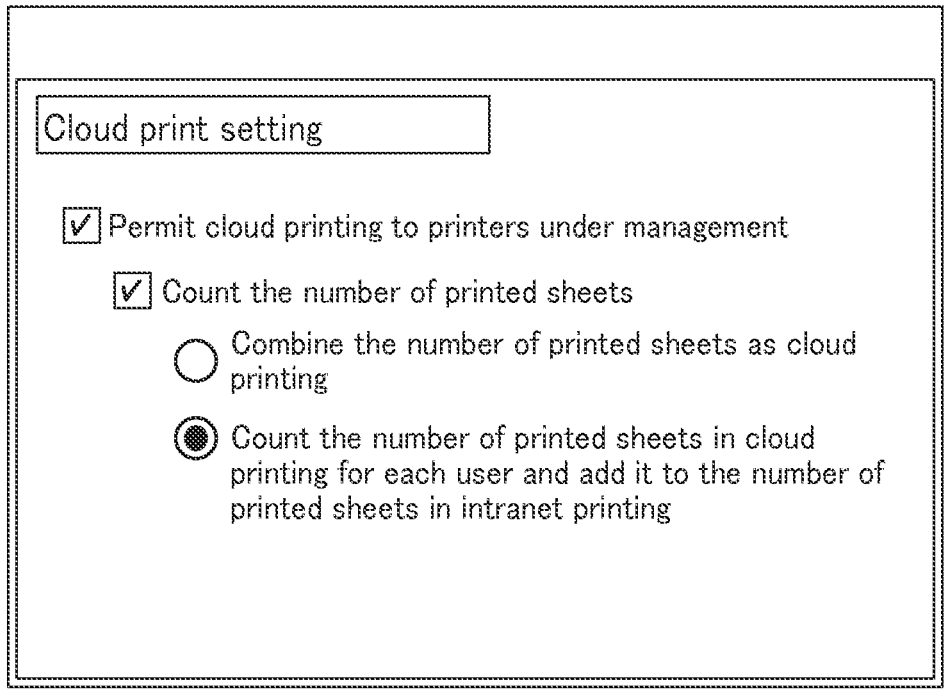
FIG. 6 illustrates a setting UI by an intranet printing managing server.
Figure 7:
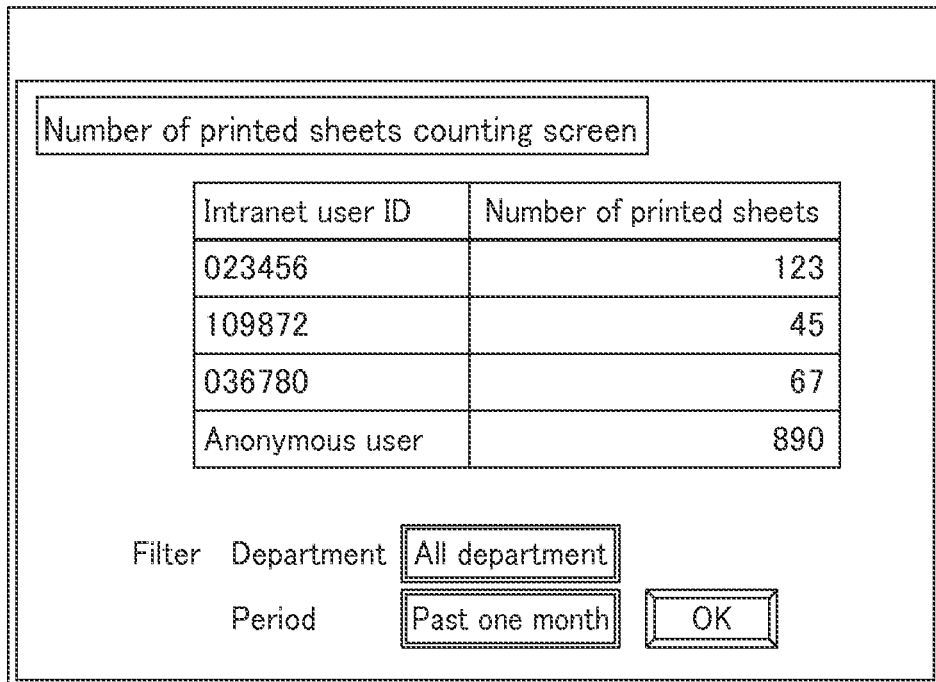
FIG. 7 illustrates a UI for the number of printed sheets-counting screen by the intranet printing managing server.

Also, a system manager in the company or the like performs a setting relating to cloud printing to the printer 120. More specifically, since a setting screen shown in FIG. 6 is displayed when the system manager accesses the intranet print managing server 130, the system manager inputs a check to "Permit cloud printing to printers under management", and selects "count the number of printed sheets for each user and add it to the number of printed sheets in intranet printing". Then, as shown in FIG. 7, a management for the number of printed sheets of an anonymous user and each intranet user ID is enabled when a manager counts the number of printed sheets. This may be set for an individual printer by designating each printer. Also, this may be set on the printer side by displaying the setting screen on the printer. This setting content is stored in the printer information storing unit 335. The printer information storing unit 335 may be provided with the printer 120.

Figure 8A:
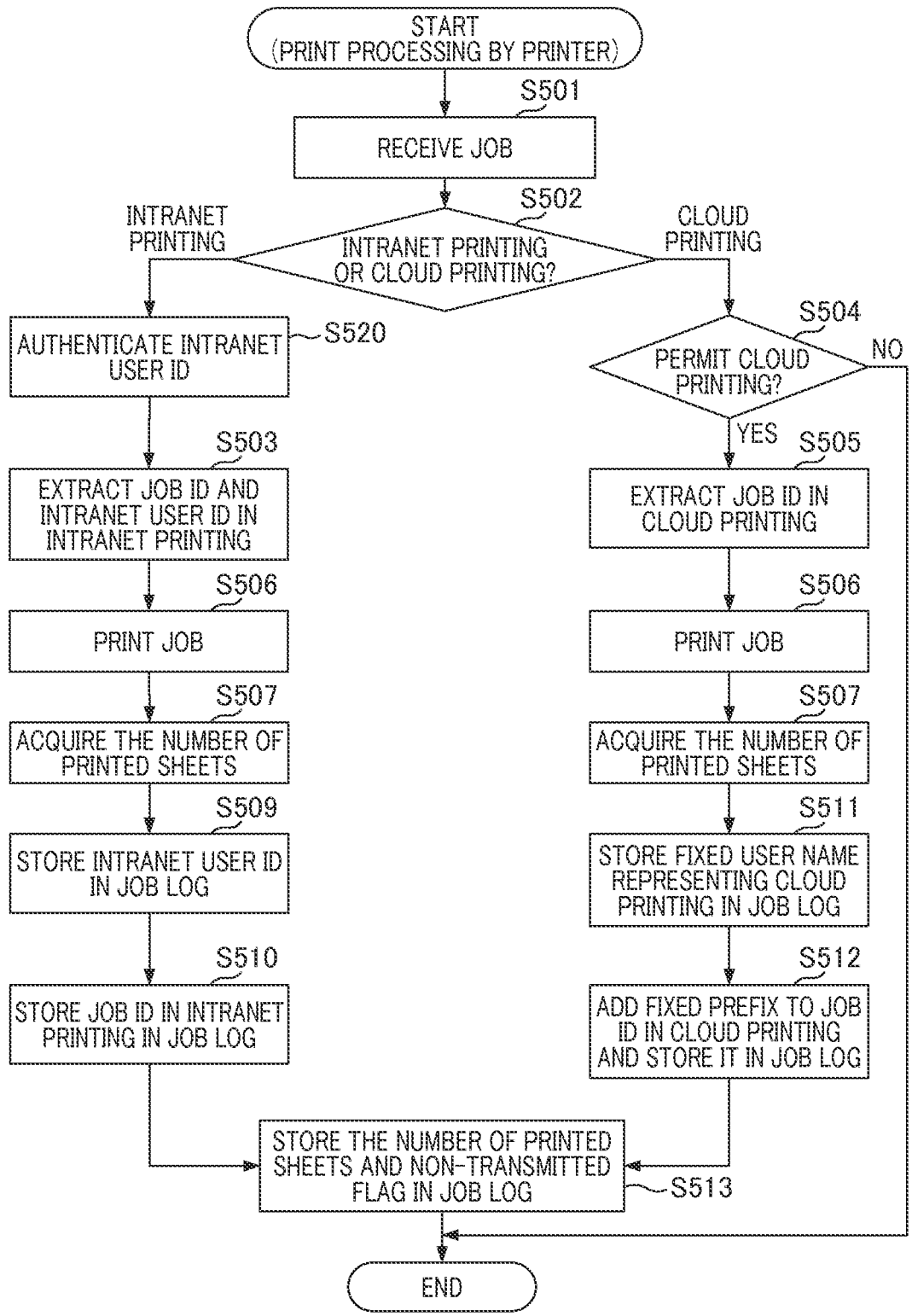
FIG. 8A and FIG. 8B illustrate flowcharts of the print processing performed by a printer.
Figure 8B:
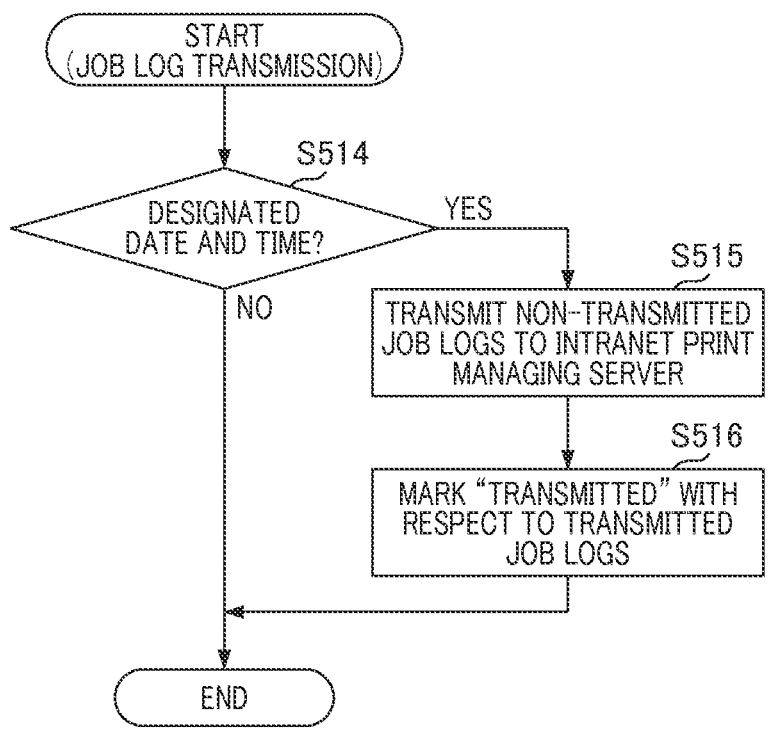

Subsequently, a description will be given of flows of the print processing and the count processing executed in the printing system according to the present invention with reference to FIG. 8 and FIG. 9. FIG. 8A and FIG. 8B illustrate process flows performed by the printer 120. These flows are processes from the time a user sends a printer instruction to the printer by a user to printing completion.

A user operates the desktop application 311 of the client 110 to thereby create content that the use wishes to be printed. Then, the user instructs the printer 120 through the printer driver 312 to print the content. The printer driver 312 generates a print job and transmits it to the printer 120. The print job receiving unit 323 of the printer 120 receives the print job (S501 in FIG. 8A).

Subsequently, the print job receiving unit 323 determines whether the received job is for intranet printing or cloud printing (S502). In intranet printing and cloud printing, the ports used when receiving the job are different from each other, and the received job can be determined based on the port. The determination method is not limited thereto, and alternatively, the received job may be determined based on information as to whether the user ID is included in the job. Next, the printer driver 312 performs the user authentication processing by using an intranet user ID of a general user with the print job receiving unit 323 (S520).

More specifically, the printer driver 312 embeds the intranet user ID and the password into the print job before transmitting the print job. The print job receiving unit 323 that has received the print job queries the authentication unit 340 of the intranet user managing server 140 about the user authentication. Note that there are different variations of the authentication method, and thus, the authentication method is not limited thereto. After the user authentication processing, the print job receiving unit 323 extracts the job ID of the print job and the intranet user ID of the general user, and temporarily stores them in association with each other (S503).

Next, the print job receiving unit 323 passes the received print job to the print processing unit 322, and the print processing unit 322 executes the print processing and the print-related processing (S506). Then, the print processing unit 322 temporarily stores the print-related information (S507). Subsequently, the print processing unit 322 stores the intranet user ID, the job ID, and the number of printed sheets used for the print processing in the job log storing unit 321 (S509, S510 and S513). FIG. 4A illustrates a job log example stored in the job log storing unit 321. More specifically, the print processing unit 322 adds a new record to a format in a table format shown in FIG. 4A. Then, the print processing unit 322 records the received date and time of the print job, the intranet user ID of the print job, the job ID of the print job, the number of printed sheets, and a transmission "non-transmitted" in a date and time column, a user ID column, a job ID column, the number of printed sheets column, and a transmission column, respectively.

Subsequently, a description will be given of the processing for transmitting the job log from the printer 120 to the intranet print managing server 130 with reference to FIG. 8B. Note that, the processing shown in FIG. 8B is performed in the both cases of intranet printing and cloud printing. The job log transmitting unit 324 periodically searches for a row in which "non-transmitted" is entered in the transmission flag column shown in FIG. 4A from among the job logs stored in the job log storing unit 321. The job log transmitting unit 324 transmits the retrieved row to the job log receiving unit 332 of the intranet print managing server 130 (S514 and S515). When the transmission is completed, the job log transmitting unit 324 records "transmitted" in the transmission flag column in FIG. 4A (S516).

Figure 9A:
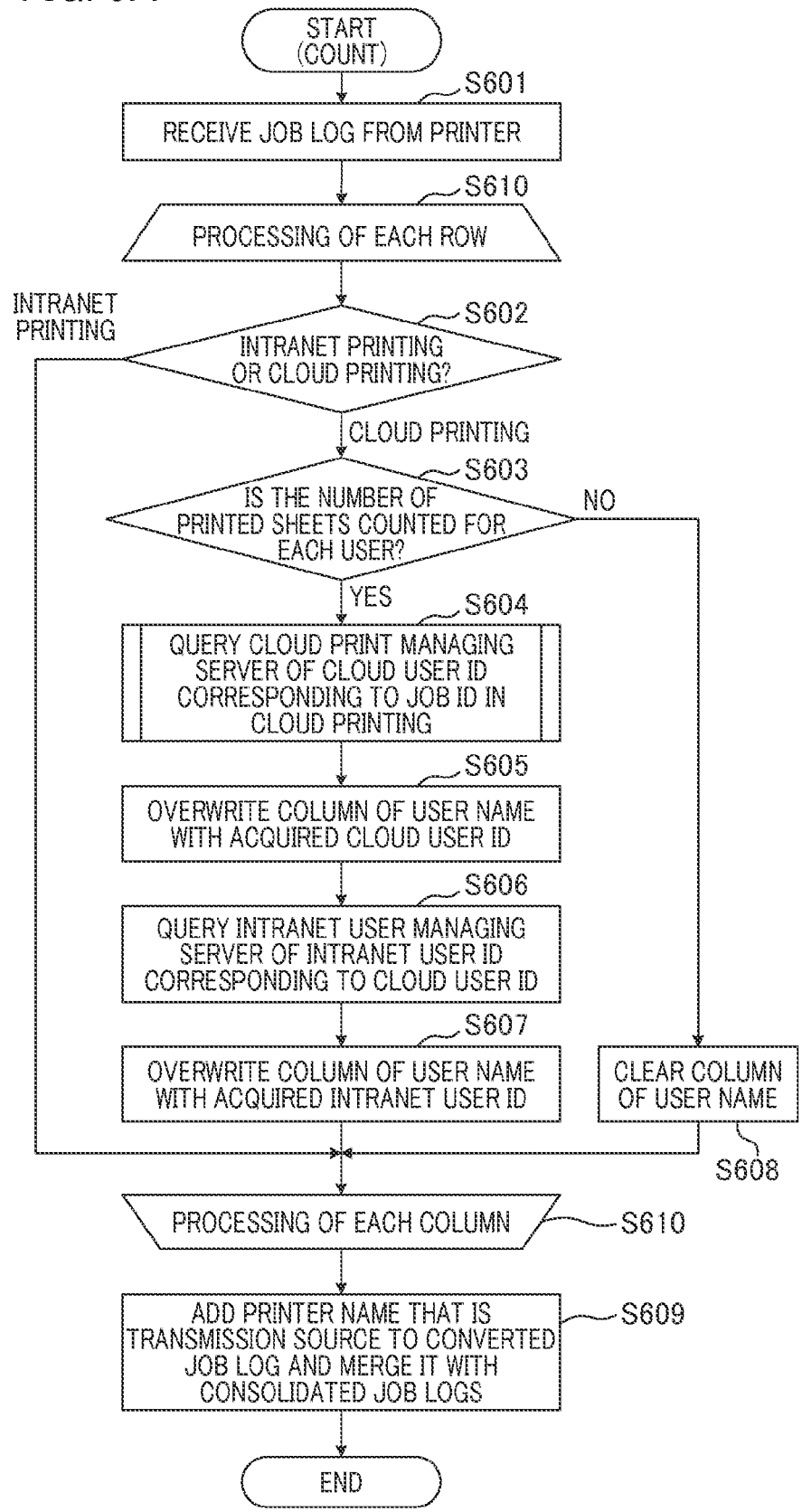
FIG. 9A and FIG. 9B illustrate flowcharts of the count processing performed by the intranet printing managing server.

Next, a description will be given of the count processing by the intranet print managing server 130 with reference to FIG. 9A. Upon receipt of a job log from each printer (S601), the job log receiving unit 332 the intranet print managing server 130 performs the analysis and update processing with respect to each row (S610). If only the job log row (reference numeral 411 in FIG. 4A) of which printing is performed in intranet printing is focused on, the job log receiving unit 332 confirms whether a column of the user ID is changed to a mark specific to cloud printing (S602).

When it is determined that the printing is intranet printing, the job log receiving unit 332 advances the processing to S610 and ends the analysis and update processing of this row. When all processing of other rows (S610) is ended, a printer ID of a transmission source is added to the object row as well as the other rows, the transmission flag column (reference numeral 415 in FIG. 4A) is eliminated, and the row focused on is merged in the consolidated job log (S609). The merge result in the consolidated job log is shown in FIG. 4B. Among printer IDs, a row 421 corresponds to the row 411 shown in FIG. 4A.

Figure 9B:
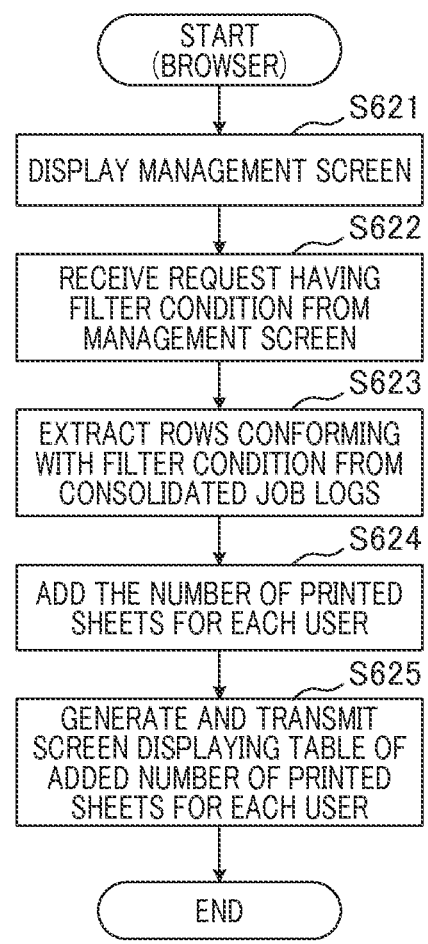

Next, a description will be given of the processing when a system manager or the like accesses the intranet print managing server 130 by using the Web browser with reference to FIG. 9B. Note that the processing shown in FIG. 9B is performed in both of the cases of intranet printing and cloud printing. When a system manager accesses the intranet print managing server 130 by using the Web browser, the intranet print managing server 130 displays a management screen (the screen without the table in FIG. 7) (S621). When the system manager presses an OK button after inputting conditions for filtering a user or a print job such as "department", "period", or the like, the intranet print managing server 130 receives the request (S622). Then, the intranet print managing server 130 issues a query for searching for a row conforming to a filter condition, and retrieves the relevant row group from the consolidated job log storing unit 331 (S623).

Subsequently, the intranet print managing server 130 batches the retrieved row group for each intranet user ID, and adds the number of printed sheets (S624). Then, the intranet print managing server 130 generates a screen in which information relating to the number of printed sheets is represented in a table format, and responds the Web browser with the screen (S625). In this manner, the system manager can comprehend the number of printed sheets for each user, and manage the number of printed sheets without experiencing a feeling that something is wrong by calling attention to a user whose number of printed sheets is high even on the occasion where cloud printing is performed.

Next, a description will be given of the print processing and the count processing in the case of cloud printing. FIG. 10 illustrates a process flow performed by the cloud print server 160. This flow is the processing from a print instruction by a user through the Web browser to a print job transmission to the printer. A general user operates the Web browser 310 of the client 110, operates the Web application 350 of the Web application server 150, and generates a content the user wishes to be printed. After generating the content, the general user instructs the Web application 350 to execute printing using the printer 120 via the cloud printing system.

The Web application 350 subjects the content to a format conversion as necessary, and transmits the content to the cloud print server 160. The content receiving unit 365 of the cloud print server 160 receives the content (S701). Subsequently, the content receiving unit 365 performs the authentication processing with the cloud user ID by cooperating with the authentication unit 380 of the cloud user managing server 180 (S702).

For example, if the Web application 350 has performed the authentication processing in advance, the Web application 350 may transmit authentication information along with the content to the content receiving unit 365. Also, if the Web application operates in another user management system, the content receiving unit 365 may cause the authentication unit 380 to display a login screen for prompting a user to input a cloud user ID and a password.

When the authentication has been completed, the content receiving unit 365 receives the content. Next, the content receiving unit 365 provides the user with a print setting screen, and determines the print setting through any user inputs. Then, the content receiving unit 365 generates print data based on the content and the print setting (S703). Further, the content receiving unit 365 generates a job ID, and combines it with the print data to thereby generate a print job (S704). Next, the print job transmitting unit 363 confirms whether a setting flag is set, to the printer information storing unit 361, for managing the number of printed sheets of the printer 120 (S707).

When the setting flag is not set, the print job transmitting unit 363 populates the print job in the cloud spooler corresponding to the printer 120 managed in the print job storing unit 364. The print job transmitting unit 363 detects that the print job is stored in the cloud spooler to thereby send the print job to the print job receiving unit 323 of the printer 120 (S705). Then, the cloud print server 160 ends the processing relating to the job.

When the setting flag is set, the job information transmitting unit 362 transmits, to the job information receiving unit 372 of the cloud print managing server 170, the cloud user ID, the job ID, and the printer name by associating them with each other. The job information receiving unit 372 of the cloud print managing server 170 stores the received cloud user ID, the job ID and the printer name in the job information storing unit 371 (S709).

Here, the detail in S709 is shown in a flowchart in FIG. 11. FIG. 11A illustrates a process flow performed by the cloud print server 160, and FIG. 11B illustrates a process flow performed by the cloud print managing server 170. Firstly, the job information transmitting unit 362 of the cloud print server 160 generates transmission information based on the cloud user ID, the job ID, and the printer name (S1401). Next, the job information transmitting unit 362 transmits the generated transmission information to the cloud print managing server 170 (S1402).

Next, the job information receiving unit 372 of the cloud print managing server 170 receives the transmission information (S1411). Subsequently, the job information receiving unit 372 resolves the transmission information into the cloud user ID, the job ID, and the printer name (S1412). Next, the job information receiving unit 372 saves the resolved information in the job information storing unit 371 (S1413). FIG. 12 shows a diagram of a storage state of the saved cloud user ID, the job ID, and the printer name. This is the detailed flow in S709. Then, the print job transmitting unit 363 transmits the print job to the printer 120 (S705). At this time, the cloud print server 160 ends the processing relating to the print job.

Returning to FIG. 8A, a description will be given of the processing performed by the printer 120 when the print job is transmitted from the cloud print server 160 to the printer 120. The print job receiving unit 323 of the printer 120 receives the print job transmitted by the cloud print server 160 (S501). Subsequently, the print job receiving unit 323 determines whether the job is for intranet printing or for cloud printing (S502). In this example, the job is for cloud printing, and thus, the processing advances to S504. At this time, unlike the case of intranet printing, the user authentication is not performed. In the light of the aforementioned security, the cloud user ID is not included in the print job.

The print job receiving unit 323 confirms with the printer information storing unit 335 of the intranet print managing server 130 whether the printer 120 is permitted to perform cloud printing (S504). When cloud printing is not permitted, the processing of the print job ends. When cloud printing is permitted, the print job receiving unit 323 extracts the job ID from the cloud print job, and temporarily stores it (S505). Then, the print job receiving unit 323 passes the received print job to the print processing unit 322, and the print processing unit 322 executes the print processing and the print-related processing (S506). Then, print-related information is temporarily stored (S507).

Subsequently, the print processing unit 322 embeds a fixed user name (for example, CloudPrint) that represents cloud printing in the user ID column 412 shown in FIG. 4A (S511). Subsequently, the print processing unit 322 adds a prefix (here, ABC is employed) to the previously temporarily stored job ID, and embeds it the job ID column 413 shown in FIG. 4A (S512). Subsequently, the print processing unit 322 embeds the print-related information (the number of printed sheets) in the relevant column (the number of printed sheets column in the present embodiment) of the job log in FIG. 4A, and embeds "non-transmitted" in the transmission flag (S513).

Next, a description will be given of the count processing by the intranet print managing server 130 in the case of cloud printing with reference to FIG. 9A. Upon receipt of a job log from each printer (S601), the job log receiving unit 332 of the intranet print managing server 130 performs the analysis and update processing with respect to each row (S610). When only focusing on the job log row (reference numeral 414 in FIG. 4A) indicating the result of the cloud printing among the job logs, firstly the job log receiving unit 332 confirms whether the column of the user ID is changed to a mark specific to cloud printing (S602).

When it is determined that the mark is cloud printing, the job log receiving unit 332 advances the processing to S603, and confirms whether "count the number of printed sheets in cloud printing for each user" is set in the printer information storing unit 335 (S603). When "count the number of printed sheets in cloud printing for each user" is not set, the job log receiving unit 332 clears the user ID column 412 in the job log FIG. 4A (S608). In this manner, the cloud print job is considered to be the printing by an anonymous user. When "count the number of printed sheets in cloud printing for each user" is set, the job log receiving unit 332 queries the job ID converting unit 373 of the cloud print managing server 170 through the job ID converting unit 333 about a cloud user ID corresponding to the cloud print job ID (S604).

Figure 14A:
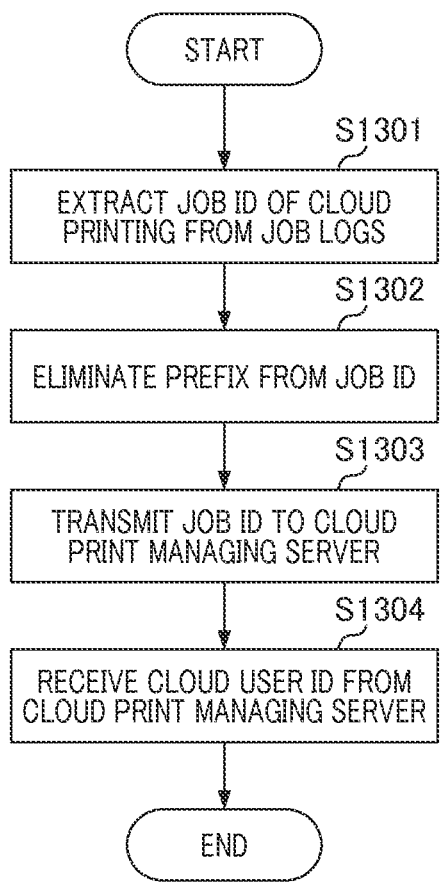
FIG. 14A and FIG. 14B illustrate a flowchart of the conversion processing to the cloud user ID.
Figure 14B:
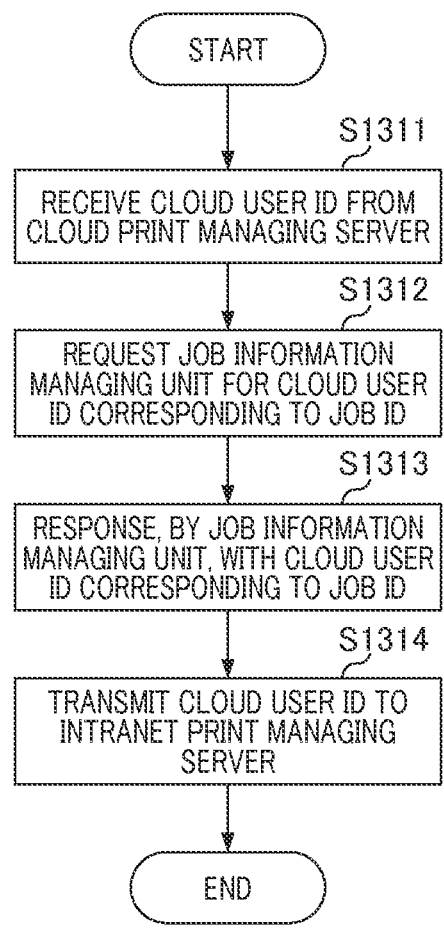

Here, the details in S604 are shown in a flowchart of FIG. 14. FIG. 14A illustrates a process flow performed by the intranet print managing server 130, and FIG. 14B illustrates the cloud print managing server 170. Firstly, the job log receiving unit 332 extracts the job ID 413 of cloud printing from the job logs shown in FIG. 4A (S1301). Next, the job log receiving unit 332 eliminates the prefix from the job ID 413 (S1302). Subsequently, the job log receiving unit 332 passes the job ID to the job ID converting unit 333. The job ID converting unit 333 transmits the job ID to the job ID converting unit 373 of the cloud print managing server 170 (S1303).

Next, the job ID converting unit 373 of the cloud print managing server 170 receives the job ID from the job ID converting unit 333 (S1311). Then the job ID converting unit 373 passes the job ID to the job information storing unit 371, and requests the corresponding cloud user ID that has been registered with the cloud print managing server 170 (S1312). Next, the job information storing unit 371 refers to the managed information table (FIG. 12), extracts the cloud user ID corresponding to the job ID, and responds the job ID converting unit 373 with the extracted cloud user ID (S1313). Subsequently, the job ID converting unit 373 transmits the cloud user ID to the job ID converting unit 333 of the intranet print managing server 130 (S1314). Finally, the job ID converting unit 333 of the intranet print managing server 130 receives the cloud user ID and continues the post-processing after the processing in S604. This is the detailed flow in S604.

Then, the job ID converting unit 333 overwrites the user ID column shown in FIG. 4A with the cloud user ID, and changes the column to the state shown in FIG. 4C (S605). The user ID 431 in FIG. 4C is the overwritten user ID. Subsequently, the job log receiving unit 332 queries the intranet user managing server 140 through the user ID converting unit 334 about the intranet user ID corresponding to the cloud user ID (S606). Upon receipt of the intranet user ID corresponding to the cloud user ID, the user ID converting unit 334 overwrites the user ID column shown in FIG. 4C with the intranet user ID acquired as the result of the query, and changes the column to the state shown in FIG. 4D (S607). The user ID 441 in FIG. 4D shows the overwritten information.

By the aforementioned processing, the analysis and update processing of the row relating to the job ID 413 in FIG. 4A ends. When the processing of other rows (S610) ends, the job log receiving unit 332 adds the printer ID of the transmission source to the row being focused on along with other rows. The job log receiving unit 332 eliminates the transmission flag, and merges the row being focused on to the consolidated job log storing unit 331 (S609). The merge result in the consolidated job log is shown in FIG. 4B. Among the rows, the row 422 corresponds to the row 414 after the update and the merge. By the processing up to this point, the user ID column of the consolidated job log is changed ether to the intranet user ID or the anonymous user ID (blank).

In the following, a description will be given of a specific conversion example principally with reference to FIG. 4. In the case of cloud printing, on the intranet side, the row 414 shown in FIG. 4A is recorded in the job log in the printer 120 in S511 to S512. At this time, the fixed string "CloudPrint" indicating cloud printing is recorded in the user ID column. Also, the prefix "ABC-" indicating cloud printing is added to the job ID "00A8D034" included in the cloud print job in the job ID column and recorded. On the other hand, on the cloud server side, the job information storing unit 371 of the cloud print managing server 170 records the row 1101 shown in FIG. 12 in S1402 to S1413. At this time, the cloud user ID "User-X" that has provided instructions for the printing is recorded in the cloud user ID column, and the job ID "00A8D034" is recorded in the job ID column.

Next, on the intranet side, the job log in the printer 120 is transmitted to the intranet print managing server 130. Then the job log is analyzed and converted for each row by the intranet print managing server 130. Since the user ID column is "CloudPrint", indicating cloud printing in the row 414 shown in FIG. 4A, the job ID "ABC-00A8D034" is extracted from the job ID column. Then, the prefix "ABC-00A8D034" is eliminated and "ABC-00A8D034" is changed to "00A8D034". The job ID "00A8D034" is transmitted to the cloud print managing server 170. In S1311 to 1314, the job ID having the eliminated prefix is converted to the cloud user ID "User-X". Then, the cloud user ID "User-X" is overwritten on the column "CloudPrint". The state after overwriting is the user ID 431 shown in FIG. 4C.

Next, the cloud user ID is converted to the intranet user ID. In S606 in FIG. 9A, the cloud user ID "User-X" queries the intranet user managing server 140, and the cloud user ID "User-X" is converted to the intranet user ID "023456". Then, the intranet user ID "023456" is overwritten on the cloud user ID "User-X" column. The state after overwriting is the user ID 441 in FIG. 4D. Finally, the row 441 is consolidated with the job logs of other printers, and this becomes the row 422 in FIG. 4B. This is the explanation of the specific conversion example. In this example, a configuration is applied where the cloud print managing server is separated from the cloud print server, but the cloud print managing server may be included in one physical device or logical device. Also, in this example, in cloud printing, the job ID is employed as specific information for specifying the cloud user ID, but the specific information is not limited thereto. The cloud print managing server 170 may acquire arbitrary information from the cloud print server 160 or the Web application 350. A configuration may be applied where the cloud print managing server 170 manages the arbitrary information by associating it with the print job to thereby pass the cloud user ID to the intranet print managing server 130 based on the arbitrary information.

As described above, according to the printing system of the present invention, even when a user uses the printer with different user IDs, a management of print-related information for each user is enabled.

Second Embodiment

In a second embodiment, a description will be given of a configuration having a function for prohibiting printing when a user tries to print in the case where the number of printed sheets in cloud printing and intranet printing exceeds the predetermined number, in addition to the function for consolidating and managing the number of printed sheets for each user in the first embodiment. A process flow is divided into the following two processing:

(1) the detection processing of an excess in the number of printed sheets, and (2) the processing for prohibiting printing.

Figure 15A:
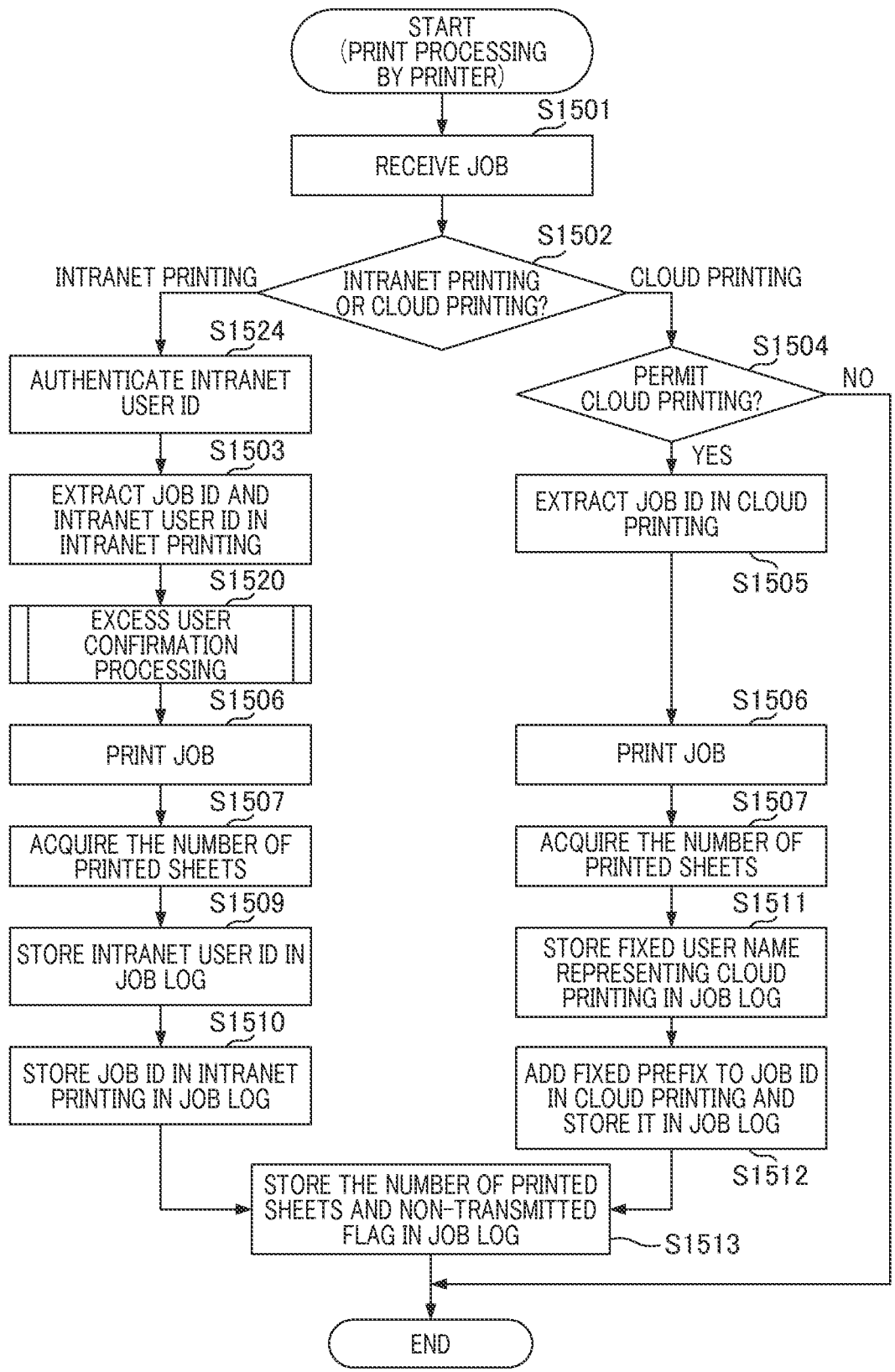
FIG. 15A and FIG. 15B illustrate a flowchart of the print processing performed by a printer.
Figure 15B:
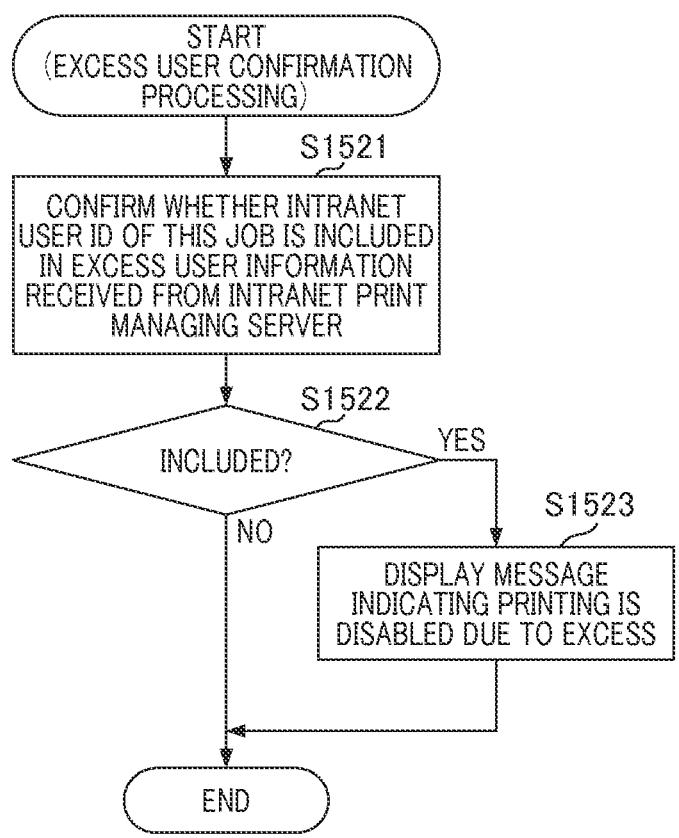
Figure 16:
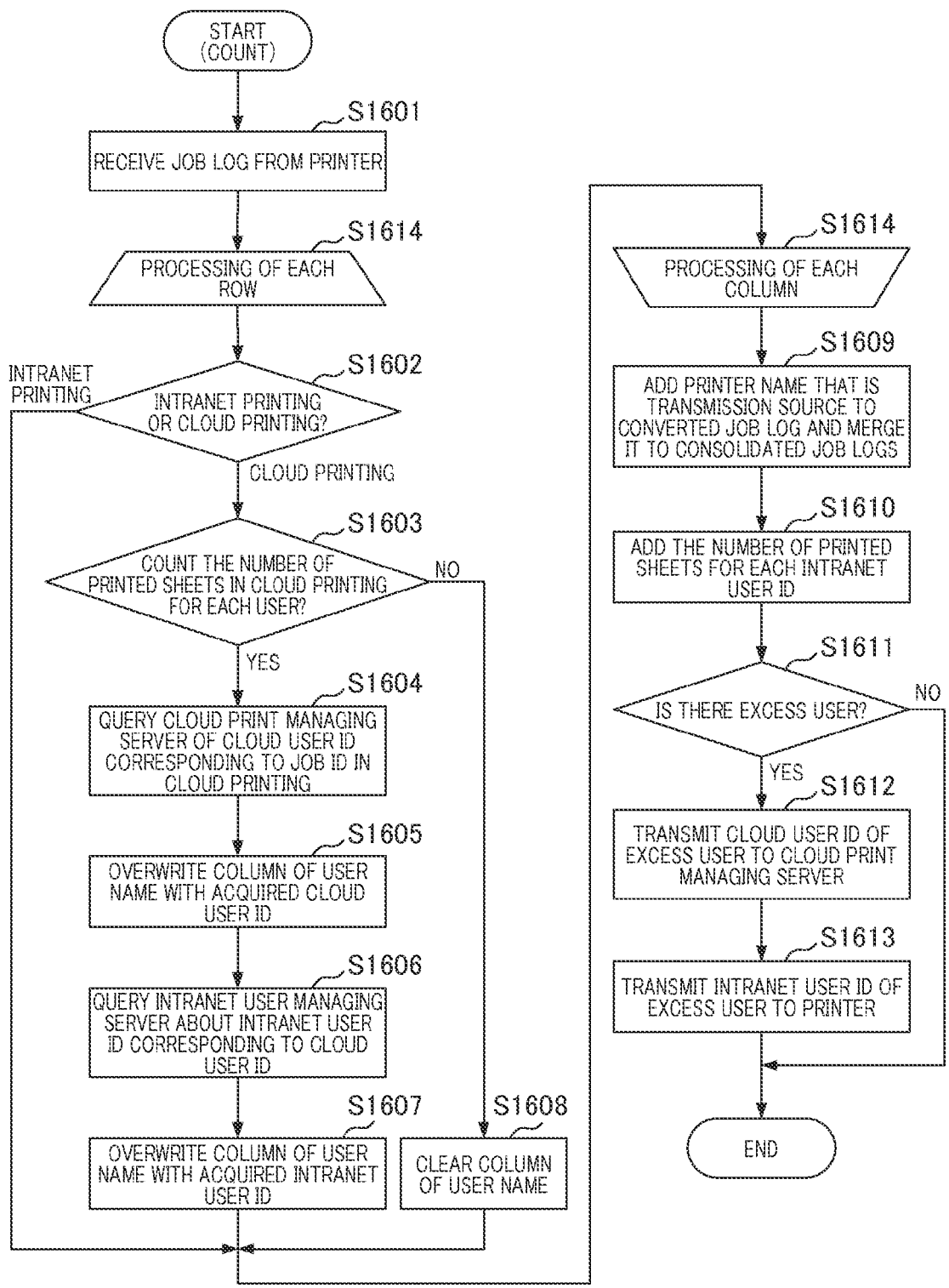
FIG. 16 illustrates a flowchart of the count processing by the intranet printing managing server managing server.

FIGS. 15, 16, and 17 illustrate flowcharts in which the print prohibition processing is added to the flowcharts shown in FIGS. 8, 9, and 10 in the first embodiment. In the following, a description will be given of the second embodiment with reference to FIGS. 15, 16, and 17. Note that the basic processing is the same as that described in the first embodiment, and thus, the differences are focused on and described.

<Detection Processing of an Excess in the Number of Printed Sheets>

FIG. 16 illustrates a process flow of the intranet print managing server 130 having a print prohibition function. The processing S1601 to S1609 is the same as that when the print prohibiting processing is not performed, and thus, the explanation thereof is omitted. At the time the processing in S1609 has completed, the job log transmitted from each printer is merged and edited, and the consolidated job log is completed at that time.

Next, the excess user ID transmitting unit 336 scans all rows of the consolidated job log, and counts the number of printed sheets for each intranet user ID (S1610). Next, the excess user ID transmitting unit 336 confirms whether the number of printable sheets with respect to all of the intranet user IDs exceeds a predetermined value (S1611). When there is no user ID whose number of printable sheets exceeds the predetermined value, the processing ends. When there is any user ID whose number of printable sheets exceeds the predetermined value, the excess user ID transmitting unit 336 notifies the cloud print managing server 170 and the printer 120 of the user ID whose number of printable sheets exceeds the limit.

Firstly, the excess user ID transmitting unit 336 notifies the cloud print managing server 170 of the excess user ID. More specifically, the excess user ID transmitting unit 336 queries, about all intranet user IDs (group) whose number of printable sheets exceeds the limit, the user ID converting unit 343 of the intranet user managing server 140 through the user ID converting unit 334. The user ID converting unit 343 converts the intranet user ID (group) to the cloud user ID (group) and transmits it to the user ID converting unit 334. Then, the excess user ID transmitting unit 336 transmits the cloud user ID (group) acquired through the user ID converting unit 334 to the excess information managing unit 375 of the cloud print managing server 170 (S1612). The excess information managing unit 375 stores excess information shown in FIG. 12. Next, all excess intranet user IDs (group) are transmitted from the excess user ID transmitting unit 336 to the excess information managing unit 325 of the printer 120 (S1613).

<Print Prohibition Processing>

A description will be given of the processing in cloud printing and intranet printing when an excess of the number of printable sheets has been detected for each user, and when information about the excess has been stored in the cloud print managing server and the printer.

Firstly, a description will be given of an operation by the cloud print server 160 with reference to FIG. 17. Since the processing S1701 to S1702 is the same with that in the case where there is no print prohibition processing, a description thereof is omitted. By the processing so far, the cloud user ID that has instructed the cloud print job is determined. The content receiving unit 365 queries the excess information managing unit 375 of the cloud print managing server 170 about the cloud user ID and confirms whether there is a cloud user ID whose number of printable sheets exceeds the limit (S1708). When there is no cloud user whose number of printable sheets exceeds the limit, the processing advances to S1703, normal cloud printing processing is performed. When there is a cloud user whose number of printable sheets exceeds the limit, the content receiving unit 365 displays a message indicating that the printing is disabled due to the excess of the number of printable sheets as a response to the instruction for cloud printing (S1710). The displayed location is assumed to be the Web browser operated by a user who provided instructions for the printing, but the display location is not limited thereto. The cloud print server 160 ends the processing relating to the print job at the time when the display is completed.

Next, a description will be given of an operation by the printer 120 when there is an intranet user ID whose number of printed sheets exceeds the limit. In cloud printing, the cloud print server 160 prohibits printing as described above, and the processing is stopped before the print job is transmitted to the printer 120. Thus, there is no need for the printer to perform any process. Here, a description will be given of an operation by the printer 120 when an excess is detected in intranet printing with reference to FIG. 15.

The processing in which the print job receiving unit 323 receives the intranet print job (S1501) and extracts the job ID and the intranet user ID (S1503) shown in FIG. 15A is the same with that when there is no print prohibition function, and thus, the description thereof is omitted. Subsequently, a description will be given of the details of the excess processing with respect to the number of printable sheets 1520 with reference to FIG. 15B.

The print job receiving unit 323 confirms with the excess information managing unit 325 whether an intranet user ID of this time's print job is the intranet user ID whose number of printable sheets exceeds the limit (S1521). When there is no intranet user ID whose number of printable sheets exceeds the limit, the processing advances to S1506, and the print processing unit 322 normally performs intranet printing. When there is an intranet user ID whose number of printable sheets exceeds the limit, the print job receiving unit 323 displays restriction information indicating a print prohibition, that is, a message indicating that the printing is disabled due to the excess of the number of printable sheets as a response to the instruction for intranet printing (S1523). A display location may be a display panel of the printer, or the massage may provide notification that a PC that is a transmission source of the print job so that the client 110 displays the message on the desktop. After the message is displayed, the printer 120 ends the processing for the intranet print job. The printer may perform the post-processing such as deletion of the print job.

Third Embodiment

In the first and second embodiments, descriptions have been mainly given about the number of printed sheets. However, an embodiment is contemplated where the printing system compiles the print information about whether a user has performed printing including an invalid word (print prohibition information). By confirming whether the print-related information includes invalid words or not, a system manager can count the number of printed sheets with the intranet print managing server and view the count result in the same data flow with the number of printed sheets. For example, in the case of cloud printing, the print job transmitting unit 363 confirms whether the generated print data includes an invalid word in S707 shown in FIG. 10. When the generated print data includes an invalid word, the job information receiving unit 372 of the cloud print managing server 170 can save the cloud user ID, the job ID, and the printer name in the job information storing unit 371. In this manner, a user who has printed content including an invalid word can be simply detected regardless the printing is intranet printing or cloud printing, resulting in support for preventing a leak of company information.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-035996 filed Feb. 26, 2013 which is hereby incorporated by reference herein in its entirety.

What is claimed is:

1. A printing system comprising an image processing apparatus, a counting server that manages the number of printed sheets printed by the image processing apparatus, and a print service server that transmits a print job to the image processing apparatus via a network,
wherein the print service server comprises:
a first management unit configured to manage information included in the print job to be transmitted and that is specific information required for specifying a user ID, and a user ID that has been registered with the print service server, wherein the image processing apparatus comprises:
a transmission unit configured to transmit, to the counting server, the number of printed sheets used upon printing based on the print job and the specific information included in the print job, and wherein the counting server comprises:
a query unit configured to query the managing unit based on the transmitted specific information about the user ID that has been registered with the print service server;
a second management unit configured to manage a user ID that has been registered with the counting server and the user ID that has been registered with the print service server by associating them with each other; and
a saving unit configured to save the user ID that has been registered with the counting server managed by the second management unit associated with the user ID acquired as the result of the query by the query unit, and the number of printed sheets transmitted by the transmission unit by associating them with each other.

2. The printing system according to claim 1, wherein the print service server further comprises a restriction unit configured to prohibit printing when the number of printable sheets for a user who has provided instructions for the printing exceeds a predetermined value.

3. The printing system according to claim 2,
wherein the counting server further comprises a determination unit configured to acquire the number of printed sheets from the image processing apparatus for each user ID that has been registered with the counting server, and determine whether or not the number of printable sheets associated with the user ID that has been registered with the counting server exceeds the predetermined value,
wherein, when it is determined that the number of printable sheets exceeds the predetermined value, the query unit acquires, the user ID that has been registered with the print service server and associated with the user ID that has been registered with the counting server from the second management unit, and transmits the acquired user ID to the print service server, and
wherein the restriction unit provides notification about restriction information indicating that the printing is prohibited, the user corresponding to the transmitted user ID that has been registered with the print service server, and the user who has provided instructions for the printing.

4. The printing system according to claim 1, wherein the image processing apparatus further comprises:
a restriction unit configured to prohibit printing when the number of printable sheets for a user who has provided instructions for the printing exceeds a predetermined value; and
a determination unit configured to determine whether or not the number of printable sheets associated with the user ID that has been registered with the counting server exceeds the predetermined value,
wherein, when it is determined by the determination unit that the number of printable sheets exceeds the predetermined value, the restriction unit provides notification about restriction information indicating that the printing is prohibited, a user corresponding to the transmitted user ID that has been registered with the counting server and who has provided instructions for the printing.

5. The printing system according to claim 1, wherein the first management unit provided in the print service server saves the user ID that has been registered with the print service server and information indicating that the printing including print prohibition information has been performed by a user corresponding to the user ID by associating them with each other.

6. The printing system according to claim 1, wherein the saving unit provided in the counting server saves the user ID that has been registered with the counting server and information indicating that the printing including print prohibition information has been performed by a user corresponding to the user ID by associating them with each other.

7. A control method of a printing system that includes an image processing apparatus, a counting server that manages the number of printed sheets printed by the image processing apparatus, and a print service server that transmits a print job to the image processing apparatus via a network, comprising:
managing, by the print service server, information included in the print job to be transmitted and that is specific information required for specifying a user ID, and a user ID that has been registered with the print service server;
transmitting, by the print service server, to the counting server, the number of printed sheets used upon printing based on the print job and the user ID that has been registered with the print service server specific;
managing, by the counting server, a user ID that has been registered with the counting server, the user ID that has been registered with the print service server, and the specific information by associating them with each other;
converting, by the counting server, the transmitted user ID that has been registered with the print service server to the user ID that has been registered with the counting server; and
saving, by the counting server, the converted user ID that has been registered with the counting server and the number of printed sheets by associating them with each other.

8. A non-transitory storage medium on which is stored a computer program for making a computer execute a control method of a printing system that includes an image processing apparatus, a counting server that manages the number of printed sheets printed by the image processing apparatus, and a print service server that transmits a print job to the image processing apparatus via a network, comprising:
managing, by the print service server, information included in the print job to be transmitted and that is specific information required for specifying a user ID, and a user ID that has been registered with the print service server;
transmitting, by the print service server, to the counting server, the number of printed sheets used upon printing based on the print job and the user ID that has been registered with the print service server;
managing, by the counting server, a user ID that has been registered with the counting server, the user ID that has been registered with the print service server, and the specific information by associating them with each other;
converting, by the counting server, the transmitted user ID that has been registered with the print service server to the user ID that has been registered with the counting server; and
saving, by the counting server, the converted user ID that has been registered with the counting server and the number of printed sheets by associating them with each other.

* * * * *